US012488227B2

United States Patent
Hwang

(10) Patent No.: US 12,488,227 B2
(45) Date of Patent: *Dec. 2, 2025

(54) NEUROMORPHIC COMPUTING DEVICE AND OPERATING METHOD THEREOF

(71) Applicant: SAMSUNG ELECTRONICS CO., LTD., Suwon-si (KR)

(72) Inventor: Youngnam Hwang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1122 days.

This patent is subject to a terminal disclaimer.

(21) Appl. No.: 17/129,280

(22) Filed: Dec. 21, 2020

(65) Prior Publication Data

US 2021/0334633 A1 Oct. 28, 2021

(30) Foreign Application Priority Data

Apr. 23, 2020 (KR) .................... 10-2020-0049485

(51) Int. Cl.
*G06N 3/063* (2023.01)
*G06N 3/065* (2023.01)
(Continued)

(52) U.S. Cl.
CPC ............ *G06N 3/063* (2013.01); *G06N 3/065* (2023.01); *G06N 3/08* (2013.01); *G11C 11/54* (2013.01);
(Continued)

(58) Field of Classification Search
CPC .......... G06N 3/063; G06N 3/065; G06N 3/08; G06N 3/045; G11C 11/54; G11C 13/0002;
(Continued)

(56) References Cited

U.S. PATENT DOCUMENTS 5,075,869 A 12/1991 Holler et al.
8,040,718 B2 10/2011 Ueda
(Continued)

FOREIGN PATENT DOCUMENTS

JP 2018163437 10/2018
JP 2019046358 3/2019
(Continued)

OTHER PUBLICATIONS

Wabe W. Koelmans, et al., "Projected phase-change memory devices", Nature Communications, published Sep. 3, 2015.
(Continued)

*Primary Examiner* — Amir Zarabian
*Assistant Examiner* — Justin Bryce Heisterkamp
(74) *Attorney, Agent, or Firm* — Fish & Richardson P.C.

(57) ABSTRACT

A neuromorphic computing device includes a first memory cell array comprising a plurality of resistive memory cells and configured to output a plurality of read currents through a plurality of bit lines or source lines; a second memory cell array comprising a plurality of reference resistive memory cells and configured to output at least one reference current through at least one reference bit line or at least one reference source line; a current-to-voltage converting circuit configured to output a plurality of signal voltages respectively corresponding to the plurality of read currents and output at least one reference voltage corresponding to the at least one reference current; and an analog-to-digital converting circuit configured to convert the plurality of signal voltages to a plurality of digital signals using the at least one reference voltage and output the plurality of digital signals.

20 Claims, 20 Drawing Sheets

(51) Int. Cl.
    *G06N 3/08*       (2023.01)
    *G11C 11/54*     (2006.01)
    *G11C 13/00*     (2006.01)
    *G06N 3/045*     (2023.01)
    *G11C 7/10*       (2006.01)
    *G11C 7/16*       (2006.01)
    *H03M 1/12*     (2006.01)
    *H03M 1/36*     (2006.01)

(52) U.S. Cl.
    CPC ...... *G11C 13/0002* (2013.01); *G11C 13/0026* (2013.01); *G11C 13/0028* (2013.01); *G11C 13/004* (2013.01); *G06N 3/045* (2023.01); *G11C 7/1006* (2013.01); *G11C 7/16* (2013.01); *G11C 13/003* (2013.01); *G11C 2013/0045* (2013.01); *G11C 2013/0054* (2013.01); *G11C 2213/79* (2013.01); *H03M 1/12* (2013.01); *H03M 1/361* (2013.01)

(58) Field of Classification Search
    CPC ............ G11C 13/0026; G11C 13/0028; G11C 13/004; G11C 7/1006; G11C 7/16; G11C 13/003; G11C 2013/0045; G11C 2013/0054; G11C 2213/79; G11C 11/56; G11C 13/0038; H03M 1/12; H03M 1/361
    See application file for complete search history.

(56) References Cited

U.S. PATENT DOCUMENTS

| | | | |
|---|---|---|---|
| 9,092,738 B2 | 7/2015 | Izhikevich et al. | |
| 9,240,799 B1 * | 1/2016 | Wang | H10B 61/00 |
| 9,620,191 B2 | 4/2017 | Pyo | |
| 10,282,657 B2 | 5/2019 | Pantazi et al. | |
| 10,453,532 B1 | 10/2019 | Antonyan | |
| 10,528,643 B1 * | 1/2020 | Choi | G06F 17/16 |
| 11,302,392 B2 * | 4/2022 | Hwang | G11C 13/0069 |
| 11,507,642 B2 * | 11/2022 | Tran | G06N 3/065 |
| 11,620,505 B2 * | 4/2023 | Jang | G11C 13/003 706/23 |
| 11,663,451 B2 | 5/2023 | Kim et al. | |
| 11,694,067 B2 | 7/2023 | Kim et al. | |
| 11,881,260 B2 * | 1/2024 | Hwang | G11C 13/004 |
| 2004/0062117 A1 * | 4/2004 | Perner | G11C 13/004 365/209 |
| 2009/0135642 A1 * | 5/2009 | Kim | G11C 11/5664 365/210.1 |
| 2009/0219753 A1 * | 9/2009 | Nozawa | G11C 11/1673 365/158 |
| 2015/0294700 A1 * | 10/2015 | Jefremow | G11C 7/227 365/191 |
| 2016/0099073 A1 * | 4/2016 | Cernea | G11C 11/5628 365/185.19 |
| 2017/0098472 A1 * | 4/2017 | Perner | G11C 11/5642 |
| 2018/0197603 A1 * | 7/2018 | Piccolboni | G11C 13/0069 |
| 2018/0225566 A1 | 8/2018 | Lee | |
| 2019/0164617 A1 | 5/2019 | Tran et al. | |
| 2019/0205729 A1 | 7/2019 | Tran et al. | |
| 2019/0392290 A1 * | 12/2019 | Otsuka | G06F 7/5443 |
| 2020/0117699 A1 * | 4/2020 | Kim | G06N 3/00 |
| 2020/0411091 A1 * | 12/2020 | Hwang | G11C 13/004 |
| 2021/0125045 A1 * | 4/2021 | Jang | G06N 3/049 |
| 2021/0173893 A1 * | 6/2021 | Luo | G06F 12/0207 |
| 2021/0241086 A1 * | 8/2021 | Yasuda | G11C 11/54 |
| 2022/0350571 A1 * | 11/2022 | Yamazaki | H10D 87/00 |
| 2023/0030605 A1 * | 2/2023 | Lee | G11C 7/1006 |
| 2024/0177772 A1 * | 5/2024 | Castro | G11C 11/54 |

FOREIGN PATENT DOCUMENTS

| | | |
|---|---|---|
| KR | 10-0905188 | 6/2009 |
| KR | 10-2019-0129384 A | 11/2019 |
| KR | 10-2020-0001377 A | 1/2020 |
| KR | 10-2020-0026586 A | 3/2020 |
| TW | I526887 B | 3/2016 |

OTHER PUBLICATIONS

Zhewei Jang et al., "XNOR-SRAM: In-Memory Computing SRAM Macro for Binary/Ternary Deep Neural Networks", 2018 Symposium on VLSI Technology Digest of Technical Papers, pp. 173-174.
Office Action in Taiwanese Appln. No. 110108882, mailed on Nov. 29, 2024, 29 pages (with machine translation).
Notice of Allowance in Korean Appln. No. 10-2020-0049485, mailed on Jul. 14, 2025, 6 pages (with English translation).

* cited by examiner

NEUROMORPHIC COMPUTING DEVICE AND OPERATING METHOD THEREOF

CROSS-REFERENCE TO RELATED APPLICATION

This application claims priority under 35 U.S.C. § 119 to Korean Patent Application No. 10-2020-0049485, filed on Apr. 23, 2020 in the Korean Intellectual Property Office, the disclosure of which is incorporated by reference herein in its entirety.

FIELD

The inventive concept relates to a neuromorphic computing device and an operating method of the neuromorphic computing device, and more particularly, to a neuromorphic computing device for performing an operation using resistive memory cells and an operating method of the neuromorphic computing device.

DISCUSSION OF RELATED ART

Applications that include deep-learning neural network (NN) or neuromorphic computing, such as image recognition, natural language processing, and various pattern matching or classification jobs, may become as important as general-purpose computing. The core computational element or neuron of a NN multiplies a set of input signals by a set of weights, and sums the products. Accordingly, the neuron performs a vector-matrix product or a multiply-accumulate (MAC) operation. The NN generally includes a number of interconnected neurons, and each neuron performs the MAC operation. Therefore, an operation of the NN is computationally intensive.

By manufacturing an artificial nervous system at the neuron level, a semiconductor circuit manufactured by simulating an information processing method processed by the brain is a neuromorphic computing device or a neuromorphic chip, and may be used effectively to realize an intelligent system self-adaptable to unspecified environments.

SUMMARY

The present disclosure provides a neuromorphic computing device and an operating method of the neuromorphic computing device that minimizes inaccurate inferences generated by the neuromorphic computing device due to a temperature and/or time dependency of a resistive memory cell.

According to an exemplary embodiment of the inventive concept, there is provided a neuromorphic computing device including a first memory cell array including a plurality of resistive memory cells and configured to output a plurality of read currents through a plurality of bit lines or source lines; a second memory cell array including a plurality of reference resistive memory cells and configured to output at least one reference current through at least one reference bit line or at least one reference source line; a current-to-voltage converting circuit configured to output a plurality of signal voltages respectively corresponding to the plurality of read currents and output at least one reference voltage corresponding to the at least one reference current; and an analog-to-digital converting circuit configured to convert the plurality of signal voltages to a plurality of digital signals using the at least one reference voltage and output the plurality of digital signals.

According to an exemplary embodiment of the inventive concept, there is provided an operating method of a neuromorphic computing device including a first memory cell array including main resistive memory cells and a second memory cell array including reference resistive memory cells including activating all reference word lines connected to the second memory cell array; obtaining at least one reference voltage value based on at least one reference current output from the second memory cell array; and outputting a plurality of digital signals by converting signal voltage values corresponding to read currents output from the first memory cell array using the at least one reference voltage value.

According to an exemplary embodiment of the inventive concept, there is provided a neuromorphic computing device including a first resistive memory cell array including a plurality of resistive memory cells disposed in a region where a plurality of word lines and a plurality of bit lines intersect; a second resistive memory cell array including a plurality of reference resistive memory cells disposed in a region where a plurality of reference word lines and a plurality of reference bit lines intersect; a word line driver configured to drive the plurality of word lines and the plurality of reference word lines, activate at least one selected word line among the plurality of word lines according to element values of an input feature vector, and activate all of the plurality of reference word lines; a current-to-voltage converting circuit configured to convert a plurality of reference currents output from the second resistive memory cell array to a plurality of reference voltages through electrical paths including the plurality of reference bit lines, and convert a plurality of read currents output from the first resistive memory cell array to a plurality of signal voltages through electrical paths including the plurality of bit lines according to the activating of the at least one selected word line; an analog-to-digital converting circuit configured to convert the plurality of signal voltages to a plurality of digital signals and output the plurality of digital signals, using the plurality of reference voltages as a reference for analog-to-digital conversion; and an adder circuit configured to generate at least one output data by performing an accumulation and/or summation operation using the plurality of digital signals.

According to an exemplary embodiment of the inventive concept, there is provided an operating method of a neuromorphic computing device including a first memory cell array having main resistive memory cells connected to a plurality of word lines and a second memory cell array having reference resistive memory cells connected to a plurality of reference word lines including activating selected word lines among the plurality of word lines according to element values of an input feature vector used in a computation of the neuromorphic computing device; activating all the plurality of reference word lines; and using at least one reference voltage value corresponding to at least one reference current output from the second memory cell array, outputting a plurality of digital signals by converting signal voltage values corresponding to read currents output from the first memory cell array to the plurality of digital signals according to the activating of the selected word lines.

According to an exemplary embodiment of the inventive concept, there is provided a neuromorphic computing device that converts current output from a crossbar array to a digital signal including a first memory cell array having a plurality of resistive memory cells respectively connected to a plurality of word lines; a second memory cell array having a plurality of reference resistive memory cells disposed in a region where a plurality of reference word lines and a plurality of reference bit lines intersect and having a same resistive material as the plurality of resistive memory cells; and a word line driver configured to drive the plurality of word lines and the plurality of reference word lines and activate all of the plurality of reference word lines during an operation of the neuromorphic computing device, and a number of reference bit lines may be same as a number obtained by subtracting 1 from a square of a number of bits of the digital signal of 2.

According to an exemplary embodiment of the inventive concept, a neuromorphic circuit includes a first memory cell array having a plurality of memory cells each connected between a respective one of a first plurality of word lines and a respective one of a second plurality of bit lines; and a second memory cell array having a plurality of reference memory cells each connected between a respective one of a first plurality of reference word lines and a respective one of a third plurality of reference bit lines; wherein the third plurality is a number of bits per memory cell, minus one, raised to a power of a number of states per bit.

BRIEF DESCRIPTION OF THE DRAWINGS

Embodiments of the inventive concept will be more clearly understood from the following detailed description taken in conjunction with the accompanying drawings, in which.

DETAILED DESCRIPTION

Hereinafter, exemplary embodiments of the inventive concept will be described in detail with reference to the accompanying drawings.

Figure 1:
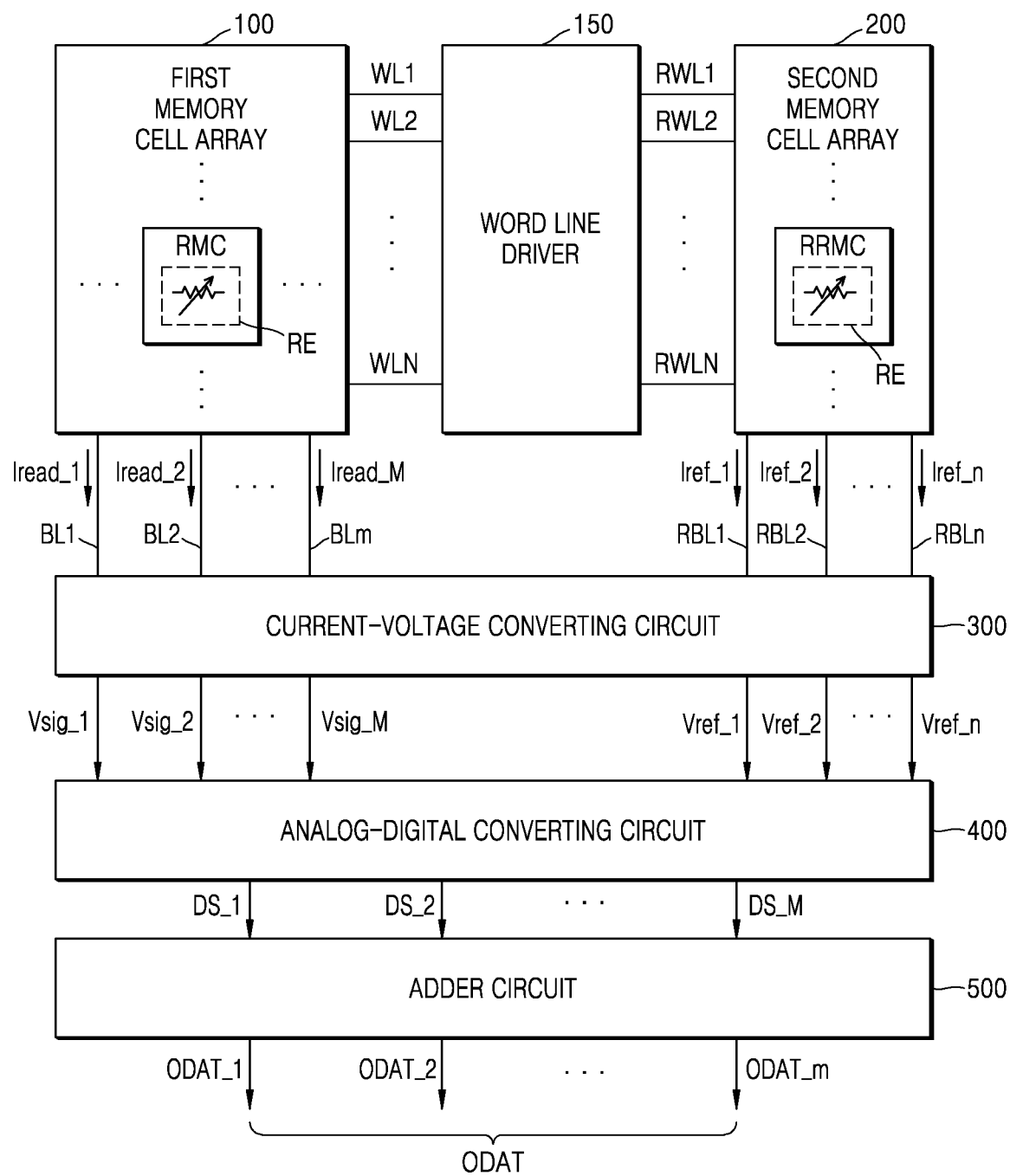
FIG. 1 is a block diagram that shows a neuromorphic computing device according to an embodiment of the inventive concept.

FIG. 1 shows a neuromorphic computing device 10 according to an embodiment of the inventive concept. The neuromorphic computing device 10 may include a first memory cell array 100, a second memory cell array 200, a word line driver 150, a current-to-voltage converting circuit 300, an analog-to-digital converting circuit 400, and an adder circuit 500. Similarly, a neuromorphic circuit embodiment may include a current-to-voltage circuit 300 coupled to the first 100 and second 200 memory cell arrays; an analog-to-digital circuit 400 coupled to the current-to-voltage circuit; and an adder circuit 500 coupled to the analog-to-digital circuit, without limitation thereto.

In an embodiment, as described below with reference to FIGS. 2A and 2B, the neuromorphic computing device 10 may be used to drive an arbitrary neural network system such as an artificial neural network (ANN) system, a convolutional neural network (CNN) system, a deep neural network (DNN) system, a deep learning system, or the like, and/or a machine learning system. For example, various services and/or applications, such as an image classify service, a user authentication service based on biometric information, an advanced driver assistance system (ADAS) service, a voice assistant service, an automatic speech recognition (ASR) service, or the like, may be executed and processed by the neuromorphic computing device 10. In this case, data stored in the first memory cell array 100 may be weights included in a plurality of layers constituting a neural network system, and a plurality of read currents Iread_1, Iread_2, . . . , Iread_M) and a plurality of signal voltages (Vsig_1, Vsig_2, . . . , Vsig_M) may indicate results of a multiply-accumulation operation performed by the neural network system. In other words, the first memory cell array 100 may perform data storage and calculation operations at once, as described later with reference to FIG. 3B. An exemplary embodiment neuromorphic circuit may include memory cells RMC of the first array 100 and reference memory cells RRMC of the second array 200 formed as resistive memory cells. The values stored by the memory cells RMC may correspond to weights to be applied to incoming signals within the neuromorphic circuit.

The first memory cell array 100 may include a plurality of resistive memory cells RMC disposed in a region where a plurality of word lines WL1, WL2, . . . , WLN (N is a natural number of 2 or more) intersect with a plurality of bit lines BL1, BL2, . . . , BLM (M is a natural number of 2 or more). Each of the plurality of resistive memory cells RMC may include a resistive element RE. A detailed structure of the first memory cell array 100 will be described later with reference to FIGS. 3A and 3C.

The first memory cell array 100 may store a plurality of pieces of data. For example, the plurality of pieces of data may be stored in the plurality of resistive memory cells RMC by using a change in resistance of the resistive element RE included in each of the plurality of resistive memory cells RMC. Also, the plurality of word lines WL1, WL2, . . . , WLN connected to the first memory cell array 100 may be driven by the word line driver 150. The first memory cell array 100 may output the plurality of read currents Iread_1, Iread_2, . . . , Iread_M respectively corresponding to the plurality of signal voltages Vsig_1, Vsig_2, . . . , Vsig_M. For example, the first memory cell array 100 may output the plurality of read currents Iread_1, Iread_2, . . . , Iread_M through electrical paths including the bit lines BL1, BL2, . . . , BLM, respectively. The first memory cell array 100 may provide the first read current Iread_1 to the M read current Iread_M to the current-to-voltage converting circuit 300.

The second memory cell array 200 may include a plurality of reference resistive memory cells RRMC disposed in a region where a plurality of reference word lines RWL1, RWL2, . . . , RWLN intersect with a plurality of reference bit lines RBL1, RBL2, . . . , RBLn (n is a natural number of 2 or more). FIG. 1 illustrates an embodiment in which the second memory cell array 200 is connected to the plurality of reference bit lines RBL1, RBL2, . . . , RBLn, but is not limited thereto, and, for example, the second memory cell array 200 may be connected to one reference bit line. The number of reference bit lines connected to the second memory cell array 200 will be described below. Each of the plurality of reference resistive memory cells RRMC may include a resistive element RE. The specific structure of the second memory cell array 200 will be described later with reference to FIGS. 4A and 4B.

In an embodiment, each of the plurality of reference resistive memory cells RRMC included in the second memory cell array 200 may include the same resistive material as the plurality of reference resistive memory cells RMC included in the first memory cell array 100.

In addition, in an embodiment, the number of reference bit lines connected to the second memory cell array 200 may be determined based on the number of bits of digital signals DS_1, DS_2, . . . , DS_M described below. For example, when the number of bits of each of the digital signals DS_1, DS_2, . . . , DS_M is k bits, the number of reference bit lines connected to the second memory cell array 200 may correspond to a number obtained by subtracting 1 from 2 raised to the power k, e.g., $2^k-1$. For example, when the digital signals DS_1, DS_2, . . . , DS_M are 1-bit digital signals, the second memory cell array 200 may be connected to one reference bit line, and when the digital signals DS_1, DS_2, . . . , DS_M are 2-bit digital signals, the second memory cell array 200 may be connected to three reference bit lines.

The second memory cell array 200 may output a plurality of reference currents Iref_1, Iref_2, . . . , Iref_n respectively corresponding to a plurality of reference voltages Vref_1, Vref_2, . . . , Vref_n. For example, the second memory cell array 200 may output the plurality of reference currents Iref_1, Iref_2, . . . , Iref_n through electrical paths including the reference bit lines RBL1, RBL2, . . . , RBLn, respectively. The second memory cell array 200 may provide the first reference current Iref_1 to the n-th reference current Iref_n to the current-to-voltage converting circuit 300.

The word line driver 150 may drive the plurality of word lines WL1, WL2, . . . , WLN connected to the first memory cell array 100, and the plurality of reference word lines RWL1, RLW2, . . . , RWLN connected to the second memory cell array 200.

For example, the word line driver 150 may drive the plurality of word lines WL1, WL2, . . . , WLN such that at least one selected from the plurality of word lines WL1, WL2, . . . , WLN is activated according to element values of an input feature vector used in the operation of the neuromorphic computing device 10. For example, when each of element values of an input feature vector of length N is '1' or '0', the word line driver 150 may drive the plurality of word lines WL1, WL2, . . . , WLN such that a word line corresponding to the position of an element having a value of '1' is activated.

The word line driver 150 may drive a plurality of reference word lines RWL1, RWL2, . . . , RWLN such that the plurality of reference word lines RWL1, RWL2, . . . , RWLN are all activated during an operation period of the neuromorphic computing device 10.

The current-to-voltage converting circuit 300 may convert input current signals to voltage signals. For example, the current-to-voltage converting circuit 300 may convert the first read current Iread_1 to output the first signal voltage Vsig_1, convert the second read current Iread_2 to output the second signal voltage Vsig_2, and in the same manner, convert the M-th read current Iread_M to output the M-th signal voltage Vsig_M. Also, for example, the current-to-voltage converting circuit 300 may convert the first reference current Iref_1 to output the first reference voltage Vref_1, convert the second reference current Iref_2 to output the second reference voltage Vref_2, and in the same manner, convert the n-th reference current Iref_n to output the n-th reference voltage Vref_n. To this end, the current-to-voltage converting circuit 300 may include a plurality of current-to-voltage converters, wherein the number of current-to-voltage converters may be the same as the number of input current signals, and, according to an embodiment, may be less than the number of input current signals. In the latter case (when the number of current-to-voltage converters is less than the number of input current signals), the current-to-voltage converters may sequentially convert the input current signals to voltage signals. The current-to-voltage converting circuit 300 may provide the plurality of signal voltages Vsig_1, Vsig_2, . . . , Vsig_M and the plurality of reference voltages Vref_1, Vref_2, . . . , Vref_n to the analog-to-digital converting circuit 400.

The analog-to-digital converting circuit 400 may use the plurality of reference voltages Vref_1, Vref_2, . . . , Vref_n to respectively convert the plurality of signal voltages Vsig_1, Vsig_2, . . . , Vsig_M to a plurality of digital signals DS_1, DS_2, . . . , DS_M), and may output the plurality of digital signals DS_1, DS_2, . . . , DS_M. For example, the analog-to-digital converting circuit 400 may use the plurality of reference voltages Vref_1, Vref_2, . . . , Vref_n as a reference for analog-to-digital conversion to convert the plurality of signal voltages Vsig_1, Vsig_2, . . . , Vsig_M to the plurality of digital signals DS_1, DS_2, . . . , DS_M. To this end, the analog-to-digital converting circuit 400 may include a plurality of analog-to-digital converters, and the number of analog-to-digital converters may be the same as the number of input signal voltages, and, according to an embodiment, may be less than the number of input signal voltages. This will be described later in more detail with reference to FIGS. 7A and 7B below. The analog-to-digital converting circuit 400 may provide the plurality of digital signals DS_1, DS_2, . . . , DS_M to the adder circuit 500.

The adder circuit 500 may generate output data ODAT by performing an accumulation and/or summation operation using the plurality of digital signals DS_1, DS_2, ..., DS_M. For example, the adder circuit 500 may use the plurality of digital signals DS_1, DS_2, ..., DS_M to output first output data ODAT_1, second output data ODAT_2 to m-th output data ODAT_m. In an embodiment, the adder circuit 500 may include at least one adder and at least one shift register.

In general, the plurality of resistive memory cells RMC included in the first memory cell array 100 may have temperature and time dependencies. For example, the resistive element RE included in each of the plurality of resistive memory cells RMC may have a temperature dependency in which resistance decreases when temperature increases and resistance increases when temperature decreases. In addition, the resistive element RE may have a time dependency such as a retention characteristic in which the resistance decreases over time, or in some cases, a drift characteristic in which the resistance increases after a certain time has elapsed after data is written. Accordingly, the plurality of read currents Iread_1, Iread_2, ..., Iread_M output from the first memory cell array 100 may depend on temperature and time, and it may be desirable to reduce or eliminate the effects of the temperature and time dependencies for accurate data storage and operation.

A neuromorphic circuit embodiment may include a word line driver circuit 150 configured to drive a respective one WLi of the first plurality of word lines and a respective one RWLi of the first plurality of reference word lines contemporaneously or substantially simultaneously. The plurality of memory cells may include a substantially same cell material as the plurality of reference memory cells, and the plurality of memory cells may have at least one of substantially same temperature characteristics or substantially same time decay characteristics as the plurality of reference memory cells.

According to the neuromorphic computing device 10 according to an embodiment of the inventive concept, the plurality of signal voltages Vsig_1, Vsig_2, ..., Vsig_M may be converted into the plurality of digital signals DS_1, DS_2, ..., DS_M by using at least one of the plurality of reference voltages Vref_1, Vref_2, ..., Vref_n obtained from at least one of the plurality of reference currents Iref_1, Iref_2, ..., Iref_n output from the second memory cell array 200 including the same resistive material as the resistive element RE included in the first memory cell array 100.

The second memory cell array 200 has the same temperature and/or time dependencies as the first memory cell array 100, thereby preventing a reduction in the accuracy of inference of the neuromorphic computing device 10 according to the temperature and/or time dependencies of the plurality of resistive memory cells RMC. That is, according to an embodiment of the inventive concept, the reliability and the accuracy of operation or inference of the neuromorphic computing device 10 may be increased.

Figure 2A:
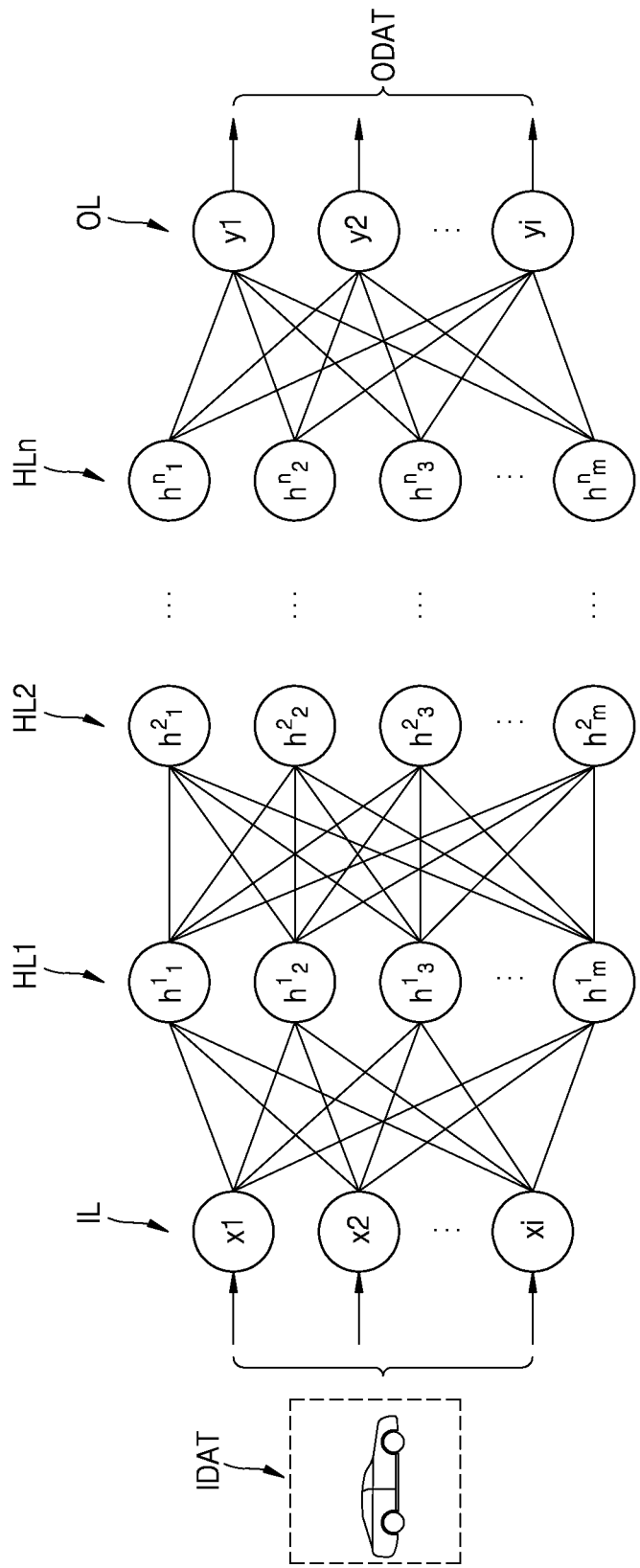
FIGS. 2A and 2B are block diagrams illustrating an example of a neural network system driven by a neuromorphic computing device according to an embodiment of the inventive concept.
Figure 2B:
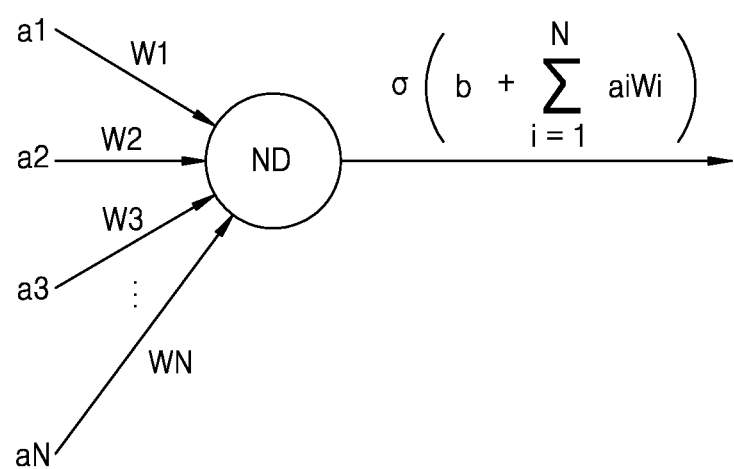

FIGS. 2A and 2B are diagrams illustrating an example of a neural network system driven by a neuromorphic computing device according to an embodiment of the inventive concept.

Referring to FIG. 2A, a network structure of a general neural network may include an input layer IL, a plurality of hidden layers HL1, HL2, ..., HLn, and an output layer OL.

The input layer IL may include i (where i is a natural number) input nodes x1, x2, ..., xi, and vector input data IDAT of length i may be input to each input node.

The plurality of hidden layers HL1, HL2, ..., HLn include n (where n is a natural number) hidden layers, and hidden nodes $h^1_1, h^1_2, h^1_3, \ldots, h^1_m, h^2_1, h^2_2, h^2_3, \ldots, h^2_m, h^n_1, h^n_2, h^n_3, \ldots, h^n_m$. For example, the hidden layer HL1 may include m (where m is a natural number) hidden nodes $h^1_1, h^1_2, h^1_3, \ldots, h^1_m$, the hidden layer HL2 may include m hidden nodes $h^2_1, h^2_2, h^2_3, \ldots, h^2_m$, and the hidden layer HLn may include m hidden nodes $h^n_1, h^n_2, h^n_3, \ldots, h^n_m$.

The output layer OL may include i (where i is a natural number) output nodes y1, y2, ..., yi corresponding to classes to be classified, and may output a result (e.g., a score or a class score) for each class with respect to the input data IDAT as output data ODAT. The output layer OL may be referred to as a fully connected layer, and for example, a probability that the input data IDAT corresponds to a vehicle may be represented by a number.

The network structure shown in FIG. 2A may include branches between nodes shown as straight lines between two nodes, and, although not shown, weights used in each of the respective branches. At this time, nodes in one layer need not be branched, and nodes included in different layers may be completely or partially branched.

Each node (e.g., $h^1_1$) of FIG. 2A may receive and operate an output of a previous node (e.g., $x_1$), and may output a result of operation to a subsequent node (e.g., $h^2_1$). At this time, each node may operate a value to be output by applying an input value to a specific function, for example, a nonlinear function.

In general, the network structure of the neural network is previously determined, and the weights according to the branches between the nodes calculate appropriate values using data with already known correct answers to determine to which class the data belong. The data with already known correct answers is referred to as 'learning data', and a process of determining the weight is referred to as 'learning'. In addition, it is assumed that a bundle of structures and weights capable of independent learning is a 'model', and a process in which a model with a determined weight predicts to which class the input data belongs and outputs a value of prediction is referred to as a 'test' process.

Referring to FIG. 2B, an example of an operation performed in one node ND included in the network structure of FIG. 2A is specifically illustrated.

When N inputs $a_1, a_2, a_3, \ldots, a_N$ are provided to the one node ND, the node ND may multiply and sum the N inputs $a_1, a_2, a_3, \ldots, a_N$ and N weights $w_1, w_2, w_3, \ldots, w_N$ respectively corresponding to the inputs $a_1, a_2, a_3, \ldots, a_N$, add an offset b to a summed input value, and apply the sum as input to a specific function σ to generate one output value (e.g., z). It shall be understood that the output z may be branched as output to one or more other nodes.

When one layer included in the network structure shown in FIG. 2A includes M nodes ND shown in FIG. 2B, output values of the one layer may be obtained as shown in Equation 1 below.

$$W*A = Z \qquad \text{[Equation 1]}$$

In Equation 1 above, W denotes weights with respect to branches included in the one layer, and may be implemented in the form of an M*N matrix. A denotes the N inputs $a_1, a_2, a_3, \ldots, a_N$ received from the one layer, and may be implemented in the form of an N*1 matrix. Z denotes M outputs $z_1, z_2, z_3, \ldots, z_M$ output from the one layer, and may be implemented in the form of an M*1 matrix.

Figure 3A:
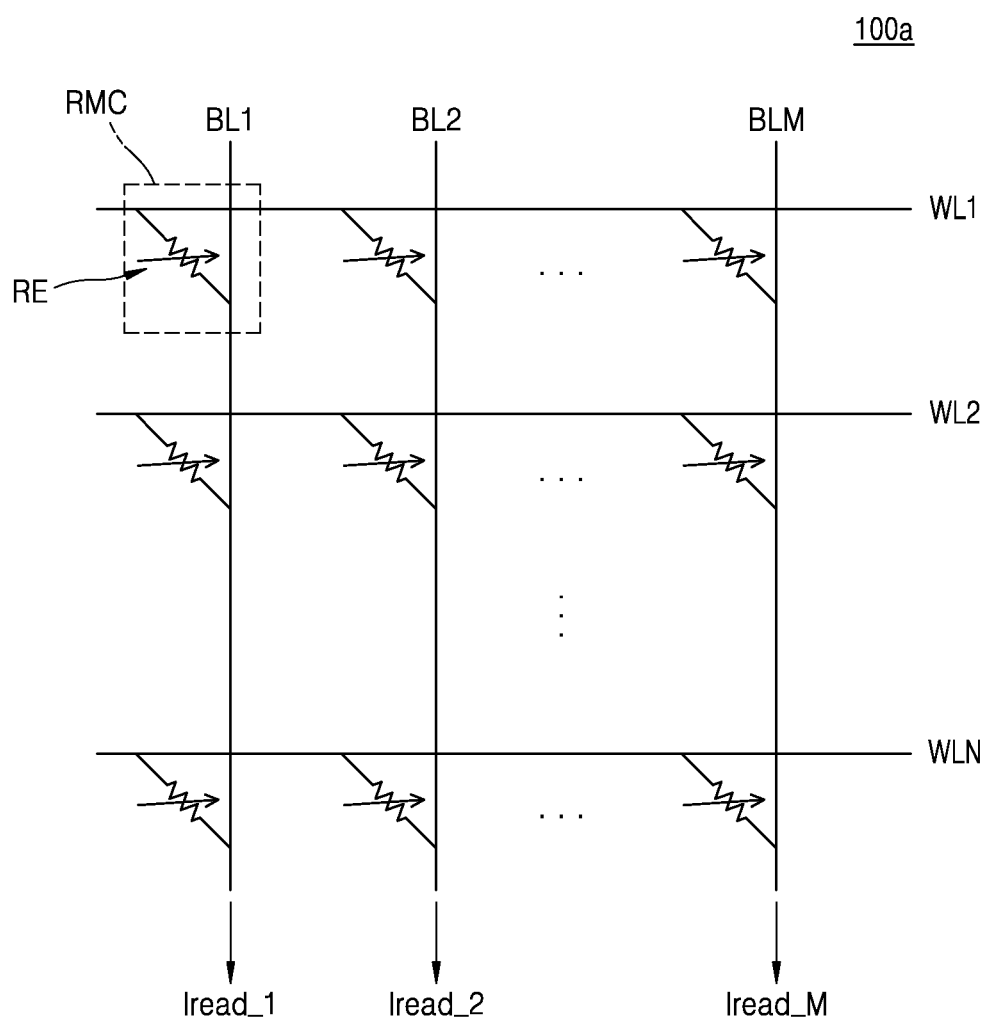
FIGS. 3A, 3B, and 3C are circuit diagrams that show first memory cell arrays according to an embodiment of the inventive concept.
Figure 3B:
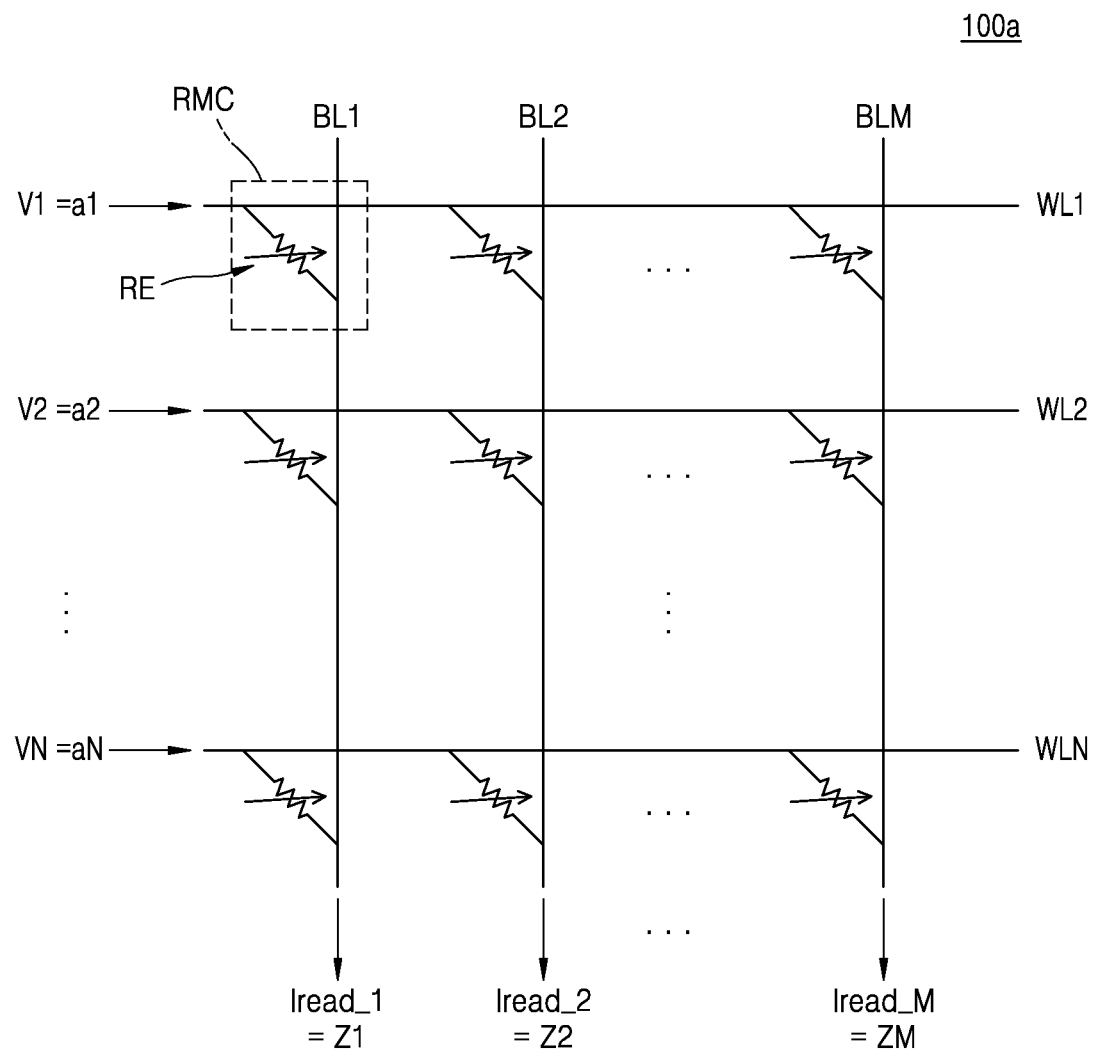
Figure 3C:
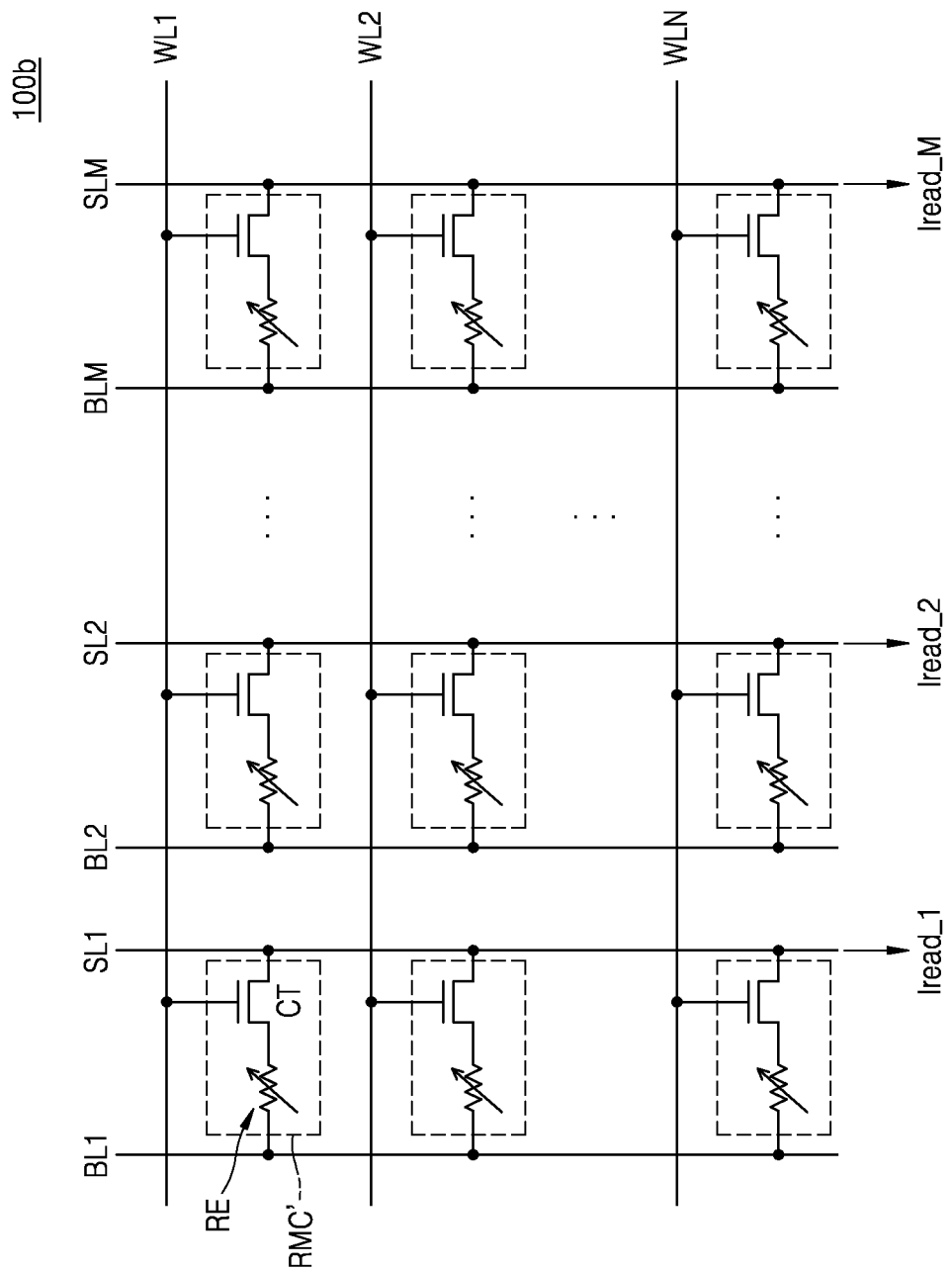

FIGS. 3A, 3B, and 3C show first memory cell arrays 100a and 100b according to an embodiment of the inventive concept. The first memory cell arrays 100a and 100b shown in FIGS. 3A to 3C may correspond to the first memory cell array 100 of FIG. 1.

Referring to FIG. 3A, the first memory cell array 100*a* may include the plurality of resistive memory cells RMC disposed in a region where the plurality of word lines WL1, WL2, . . . , WLN intersect with the plurality of bit lines BL1, BL2, . . . , BLM. Each of the plurality of resistive memory cells RMC may include a resistive element RE, and may be connected to one of the plurality of word lines WL1, WL2, . . . , WLN and one of the plurality of bit lines BL1, BL2, . . . , BLM.

A resistance value of the resistive element RE may be changed by a write voltage applied through the plurality of word lines WL1, WL2, . . . , WLN and/or the plurality of bit lines BL1, BL2, . . . , BLM. The plurality of resistive memory cells RMC may store data due to the resistance change. For example, when a write voltage is applied to a selected word line and a ground voltage (e.g., about 0 V) is applied to a selected bit line, data '1' may be written to a selected resistive memory cell, and when the ground voltage is applied to the word line and the write voltage is applied to the selected bit line, data '0' may be written to the selected resistive memory cell. Further, when a read voltage is applied to the selected word line and the ground voltage is applied to the selected bit line, data written to the selected resistive memory cell may be read.

In an embodiment, each of the plurality of resistive memory cells RMC may be implemented by including an arbitrary resistive memory cell such as a phase change random-access memory (PRAM) cell, a resistance random-access memory (RRAM) cell, a magnetic random-access memory (MRAM) cell, a ferroelectric random-access memory (FRAM) cell, or the like.

In an embodiment, the resistive element RE may include a phase-change material of which a crystal state changes according to the amount of current. The phase-change material may use various kinds of materials such as GaSb, InSb, InSe, Sb2Te3, and/or GeTe, which are 2-element compounds, GeSbTe, GaSeTe, InSbTe, SnSb2Te4, and/or InSbGe, which are 3-element compounds, and AgInSbTe, (GeSn)SbTe, GeSb(SeTe), and/or Te81Ge15Sb2S2, which are 4-element compounds, or the like. In another embodiment, the resistive element RE may include perovskite compounds, transition metal oxide, magnetic materials, ferromagnetic materials, or antiferromagnetic materials. However, the resistive material included in the resistive element RE is not limited to the above-described materials.

Referring to FIG. 3B, an example in which the first memory cell array 100*a* of FIG. 3A performs the above-described operation with reference to FIGS. 2A and 2B is illustrated.

Each resistive memory cell RMC may correspond to one synapse or branch of a neural network system, and may store one weight. Accordingly, the M*N data stored in the first memory cell array 100*a* may correspond to a weight matrix implemented in the form of the M*N matrix included in the one layer described above with reference to FIGS. 2A and 2B, that is, W of [Equation 1] above.

N input voltages V1, V2, . . . , VN applied through the plurality of word lines WL1, WL2, . . . , WLN may correspond to the N inputs $a_1, a_2, \ldots, a_N$ received from the one layer, and may correspond to an input matrix implemented in the form of the N*1 matrix, that is, A in [Equation 1] above.

The M read currents Iread_1, Iread_2, . . . , Iread_M output through the plurality of bit lines BL1, BL2, . . . , BLM may correspond to the M outputs $z_1, z_2, z_3, \ldots, z_M$ output from the one layer, and may correspond to an output matrix implemented in the form of the M*1 matrix, that is, Z in [Equation 1] above.

In other words, in a state in which the first memory cell array 100*a* is implemented by storing a plurality of weights in the form of a matrix in the plurality of resistive memory cells RMC, when the input voltages V1, V2, . . . , VN corresponding to a plurality of input values are input through the plurality of word lines WL1, WL2, . . . , WLN, the read currents Iread_1, Iread_2, . . . , Iread_M output through the plurality of bit lines BL1, BL2, . . . , BLM may be results of a multiply-accumulation operation performed by the neural network system. When a plurality of layers of the neural network system are all implemented as described above, a neuromorphic computing device that performs both data storage and computation operations may be implemented.

Referring to FIG. 3C, the first memory cell array 100*b* may include a plurality of resistive memory cells RMC' disposed in a region where the plurality of word lines WL1, WL2, . . . , WLN, the plurality of bit lines BL1, BL2, . . . , BLM, and a plurality of source lines SL1, SL2, . . . , SLM intersect with each other.

Each of the plurality of resistive memory cells RMC' may include a cell transistor CT and a resistive element RE, and may be connected to one of the plurality of word lines WL1, WL2, . . . , WLN, one of the plurality of bit lines BL1, BL2, . . . , BLM, and one of the plurality of source lines SL1, SL2, . . . , SLM. For example, the cell transistor CT may include a first electrode connected to one of the plurality of source lines SL1, SL2, . . . , SLM, a gate electrode and a second electrode connected to one of the plurality of word lines WL1, WL2, . . . , WLN. The resistive element RE may be connected between the second electrode of the cell transistor CT and one of the plurality of bit lines BL1, BL2, . . . , BLM.

For example, when a power voltage (e.g., VCC) is applied to the selected word line, the write voltage is applied to the selected bit line, and the ground voltage is applied to a selected source line, data '1' may be written to the selected resistive memory cell, and when the power voltage is applied to the selected word line, the ground voltage is applied to the selected bit line, and the write voltage is applied to the selected source line, data '0' may be written to the selected resistive memory cell. In addition, when the power voltage is applied to the selected word line, the read voltage is applied to the selected bit line, and the ground voltage is applied to the selected source line, data written to the selected resistive memory cell may be read.

The first memory cell array 100*b* may output the plurality of read currents Iread_1, Iread_2, . . . , Iread_M through electrical paths including a plurality of bit lines BL1, BL2, . . . , BLM, respectively. In an embodiment, the first memory cell array 100*b* may output the first read current Iread_1 flowing through the first bit line BL1 and flowing out through the first source line SL1, output the second read current Iread_2 flowing through the second bit line BL2 and flowing out through the second source line SL2, and output the M-th read current Iread_M flowing through the M-th bit line BLM and flowing out through the M-th source line SLM.

Moreover, a case in which the first memory cell arrays 100*a* and 100*b* are formed in a two-dimensional array structure is described with reference to FIGS. 3A, 3B, and 3C, but the inventive concept is not limited thereto, and according to an embodiment, the first memory cell arrays may be formed in a three-dimensional vertical array structure. The structure of the resistive memory cells RMC and RMC' may also be changed according to embodiments.

Figure 4A:
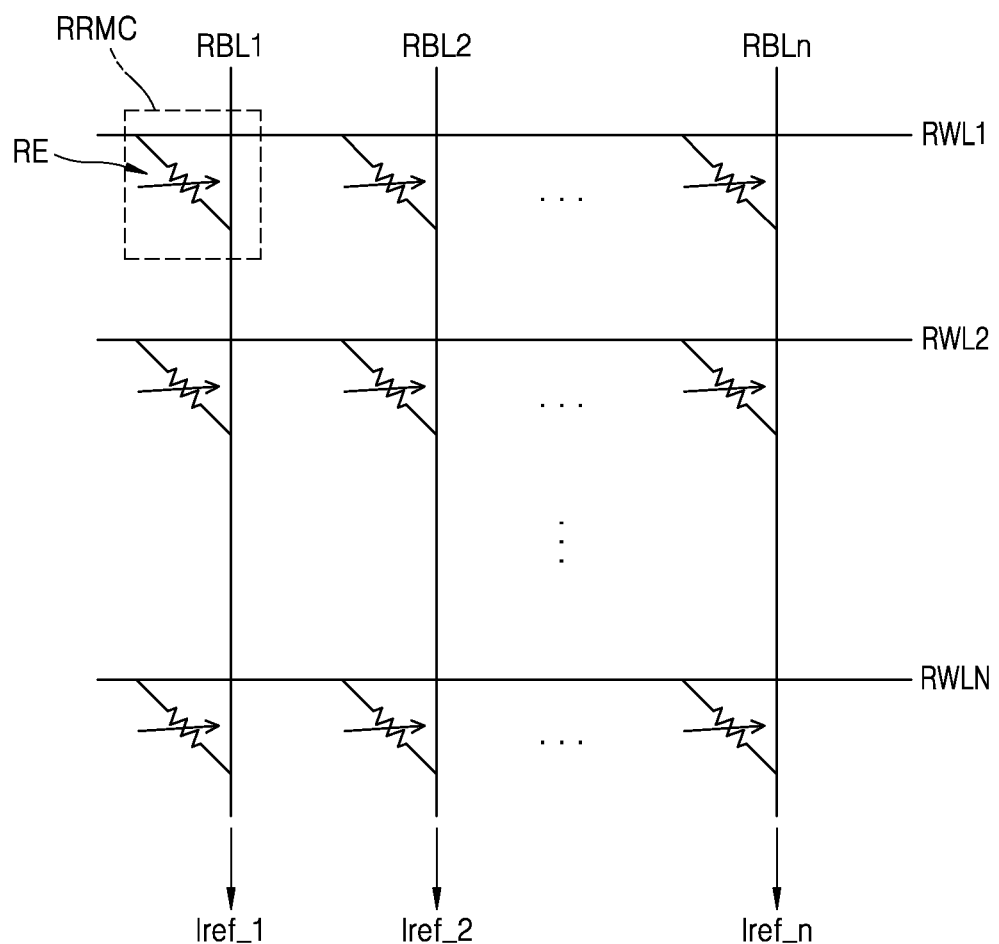
FIGS. 4A and 4B are circuit diagrams that show second memory cell arrays according to an embodiment of the inventive concept.
Figure 4B:
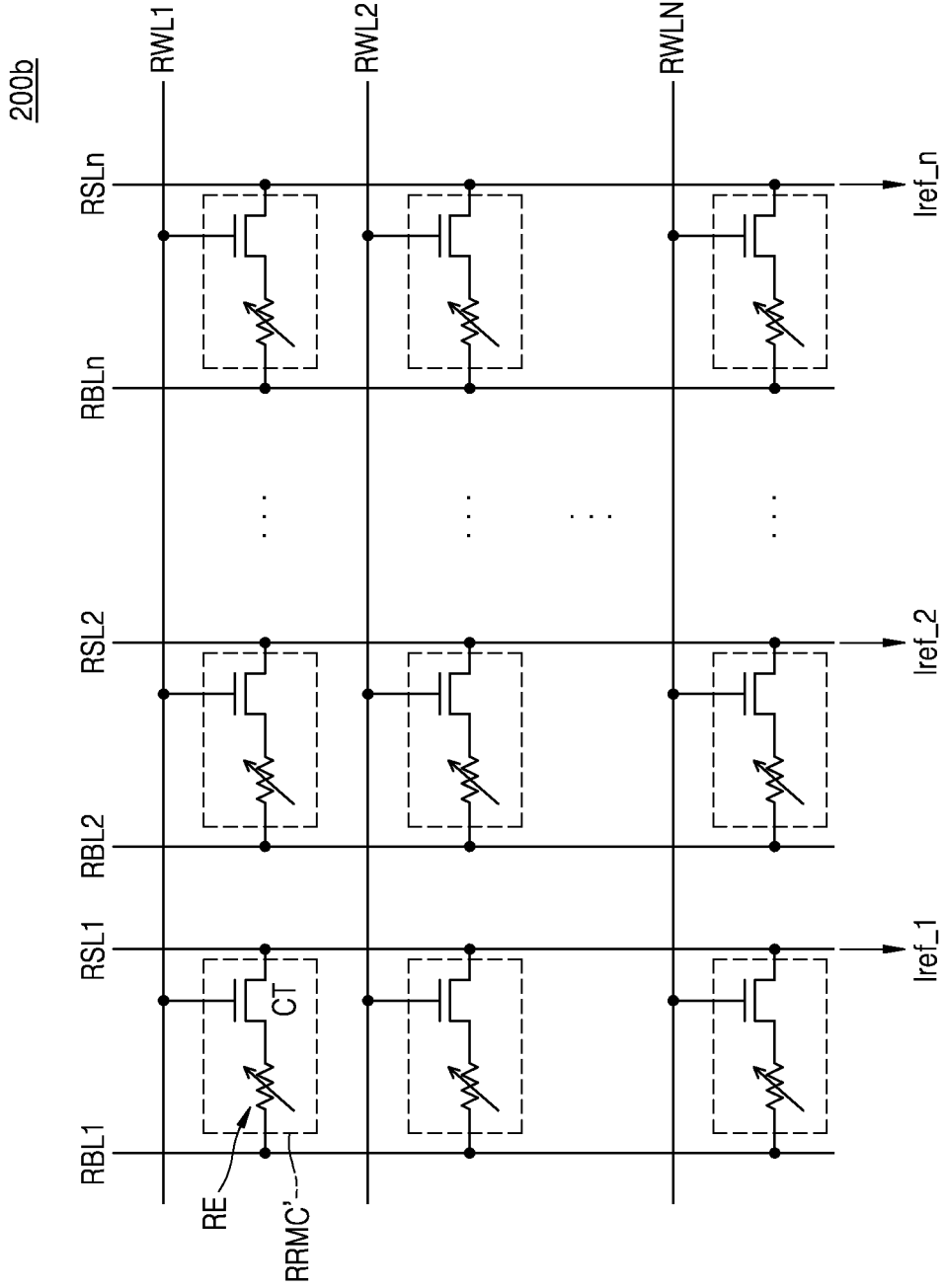

FIGS. 4A and 4B show second memory cell arrays 200a and 200b according to an embodiment of the inventive concept. The second memory cell arrays 200a and 200b described with respect to FIGS. 4A and 4B may correspond to the second memory cell array 200 of FIG. 1.

Referring to FIG. 4A, the second memory cell array 200a may include the plurality of reference resistive memory cells RRMC disposed in a region where the plurality of reference word lines RWL1, RWL2, . . . , RWLN intersect with the plurality of reference bit lines RBL1, RBL2, . . . , RBLn. Each of the plurality of reference resistive memory cells RRMC may include a resistive element RE, and may be connected to one of the plurality of reference word lines RWL1, RWL2, . . . , RWLN and the plurality of reference bit lines RBL1, RBL2, . . . , RBLn. In an embodiment, the resistive element RE may include the same resistive material as the resistive element RE of the first memory cell array (100 of FIG. 1), and the detailed description thereof may be understood from the description of FIGS. 1 and 3A.

The second memory cell array 200a may output a plurality of reference currents Iref_1, Iref_2, . . . , Iref_n through an electrical path including a plurality of reference bit lines RBL1, RBL2, . . . , RBLn. For example, the second memory cell array 200a may output the first reference current Iref_1 through the first reference bit line RBL1, may output the second reference current Iref_2 through the second reference bit line RBL2, and may output the n-th reference current Iref_n through the n-th reference bit line RBLn.

Referring to FIG. 4B, the second memory cell array 200b may include a plurality of reference resistive memory cells RRMC' disposed in a region where the plurality of reference word lines RWL1, RWL2, . . . , RWLN intersect with the plurality of reference bit lines RBL1, RBL2, . . . , RBLn and the plurality of reference source lines RSL1, RSL2, . . . , RSLn.

Each of the plurality of reference resistive memory cells RRMC' may include a cell transistor CT and a resistive element RE, and may be connected to one of the plurality of word lines WL1, WL2, . . . , WLN, one of the plurality of bit lines BL1, BL2, . . . , BLM, and one of the plurality of source lines SL1, SL2, . . . , SLM. For example, the cell transistor CT may include a first electrode connected to one of the plurality of source lines SL1, SL2, . . . , SLM, a gate electrode connected to one of the plurality of word lines WL1, WL2, . . . , WLN. The resistive element RE may be connected between the second electrode of the cell transistor CT and one of the plurality of bit lines BL1, BL2, . . . , BLM. The detailed description may be understood from the description of FIGS. 1 and 3C.

The second memory cell array 200b may output the plurality of reference currents Iref_1, Iref_2, . . . , Iref_n through electrical paths including the plurality of reference bit lines RBL1, RBL2, . . . , RBLn, respectively. In an embodiment, the second memory cell array 200b may output the first reference current Iref_1 flowing through the first reference bit line RBL1 and flowing out through the first reference source line RSL1, output the second reference current Iref_2 flowing through the second reference bit line RBL2 and flowing out through the second reference source line RSL2, and output the n-th reference current Iref_n flowing through the n-th reference bit line RBLn and flowing out through the n-th reference source line RSLn.

Figure 5:
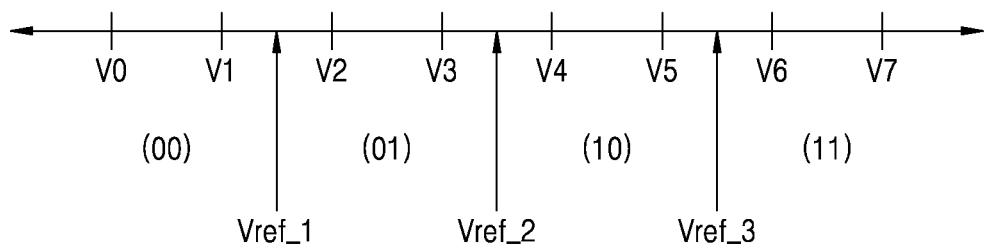
FIG. 5 is a graphical diagram that shows an operating voltage range of an analog-to-digital converting circuit and a plurality of reference voltages according to an embodiment of the inventive concept.

FIG. 5 shows an operating voltage range of the analog-to-digital converting circuit 400 and the plurality of reference voltages Vref_1, Vref_2, and Vref_3 according to an embodiment of the inventive concept. FIG. 5 illustrates an embodiment in which the plurality of digital signals DS_1, DS_2, . . . , DS_M output by the analog-to-digital converting circuit 400 of FIG. 1 are 2-bit digital signals. The number of bits of a digital signal and the number of reference voltages as described above are merely examples for convenience of description and are not limited to those illustrated in FIG. 5. FIG. 5 is described with reference to FIG. 1 together.

The analog-to-digital converting circuit 400 may convert a plurality of signal voltages to a plurality of digital signals using a plurality of reference voltages provided from the current-to-voltage converting circuit 300. The plurality of reference voltages may be used as a reference value for converting the signal voltage in the form of an analog signal to a digital signal.

For example, when the first signal voltage Vsig_1 is less than the first reference voltage Vref_1, the analog-to-digital converting circuit 400 may output '00' as the first digital signal DS_1 corresponding to the first signal voltage Vsig_1. Also, for example, when the first signal voltage Vsig_1 is greater than or equal to the first reference voltage Vref_1 and less than the second reference voltage Vref_2, the analog-to-digital converting circuit 400 may output '01' as the first digital signal DS_1 corresponding to the first signal voltage Vsig_1. Also, for example, when the first signal voltage Vsig_1 is greater than or equal to the second reference voltage Vref_2 and less than the third reference voltage Vref_3, the analog-to-digital converting circuit 400 may output '10' as the first digital signal DS_1 corresponding to the first signal voltage Vsig_1. Also, for example, when the first signal voltage Vsig_1 is greater than or equal to the third reference voltage Vref_3, the analog-to-digital converting circuit 400 may output '11' as the first digital signal DS_1 corresponding to the first signal voltage Vsig_1.

Referring to FIG. 5, the plurality of reference voltages including the first reference voltage Vref_1 to the third reference voltage Vref_3 may substantially equally divide the operating voltage range of the analog-to-digital converting circuit 400. However, the inventive concept is not limited thereto, and the plurality of reference voltages may unequally divide the operating voltage range of the analog-to-digital converting circuit 400. This embodiment will be described in more detail with reference to FIG. 10.

Figure 6:
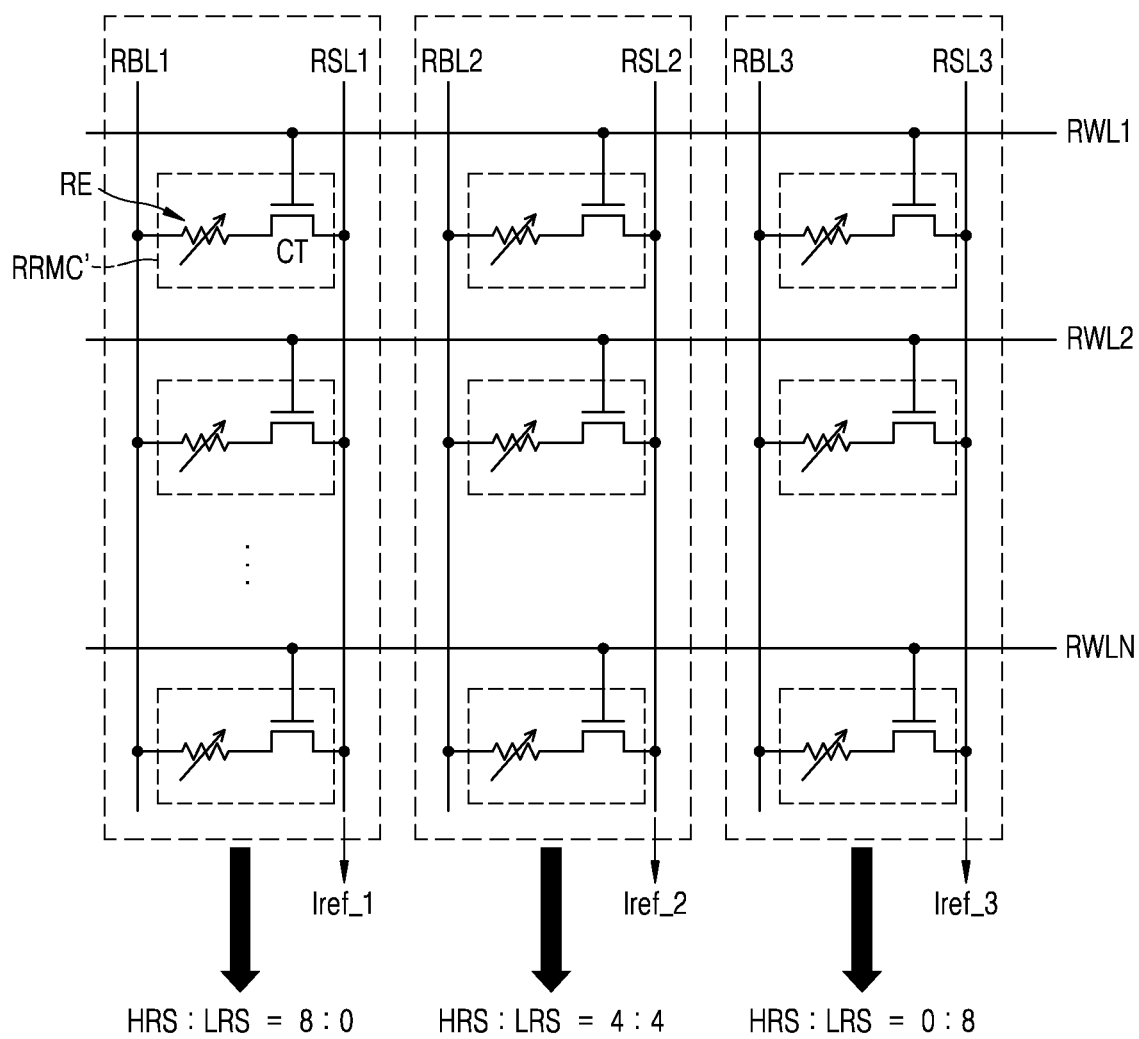
FIG. 6 is a circuit diagram that illustrates states of a second memory cell array and reference memory cells according to an embodiment of the inventive concept.

FIG. 6 illustrates states of the second memory cell array 200 and reference memory cells according to an embodiment of the inventive concept. FIG. 6 may illustrate an embodiment in which the number of reference bit lines is 3 in the second memory cell array 200b according to the embodiment of FIG. 4C. In particular, FIG. 6 may show an embodiment in which the operating voltage range of the analog-to-digital converting circuit 400 is substantially equally divided as shown in FIG. 5. FIG. 6 is described with reference to FIGS. 1 and 5 together.

The second memory cell array 200 may output the first reference current Iref_1 corresponding to the first reference voltage Vref_1 through the first reference source line RSL1. Referring to FIG. 5, the first reference voltage Vref_1 may be generated by having data written such that memory cells of a high resistance state HRS are more than memory cells of a low resistance state LRS in reference resistance memory cells connected to the first reference bit line RBL1, corresponding to the first reference source line RSL1. As a non-limiting example, with respect to the reference resistance memory cells connected to the first reference bit line RBL1, the ratio of the number of memory cells of the high resistance state HRS to the number of memory cells of the low resistance state LRS may be 8:0.

The second memory cell array 200 may output the second reference current Iref_2 corresponding to the second reference voltage Vref_2 through the second reference source line RSL2. The second reference voltage Vref_2 may be generated by having data written such that the number of memory cells of the high resistance state HRS is the same as the number of memory cells of the low resistance state LRS in reference resistance memory cells connected to the second reference bit line RBL2, corresponding to the second reference source line RSL2. As a non-limiting example, with respect to the reference resistance memory cells connected to the second reference bit line RBL2, the ratio of the number of memory cells of the high resistance state HRS to the number of memory cells of the low resistance state LRS may be 4:4.

The second memory cell array 200 may output the third reference current Iref_3 corresponding to the third reference voltage Vref_3 through the third reference source line RSL3. The third reference voltage Vref_3 may be generated by having, data written such that the memory cells of the high resistance state HRS are smaller than the memory cells of the low resistance state LRS in reference resistance memory cells connected to the third reference bit line RBL3, corresponding to the third reference source line RSL3. As a non-limiting example, with respect to the reference resistance memory cells connected to the third reference bit line RBL3, the ratio of the number of memory cells of the high resistance state HRS to the number of memory cells of the low resistance state LRS may be 0:8.

As described above, for the second memory cell array 200 to respectively output reference currents corresponding to reference voltages of different levels, the ratio of the memory cells of the high resistance state HRS to the memory cells of the low resistance state LRS may be different.

Figure 7A:
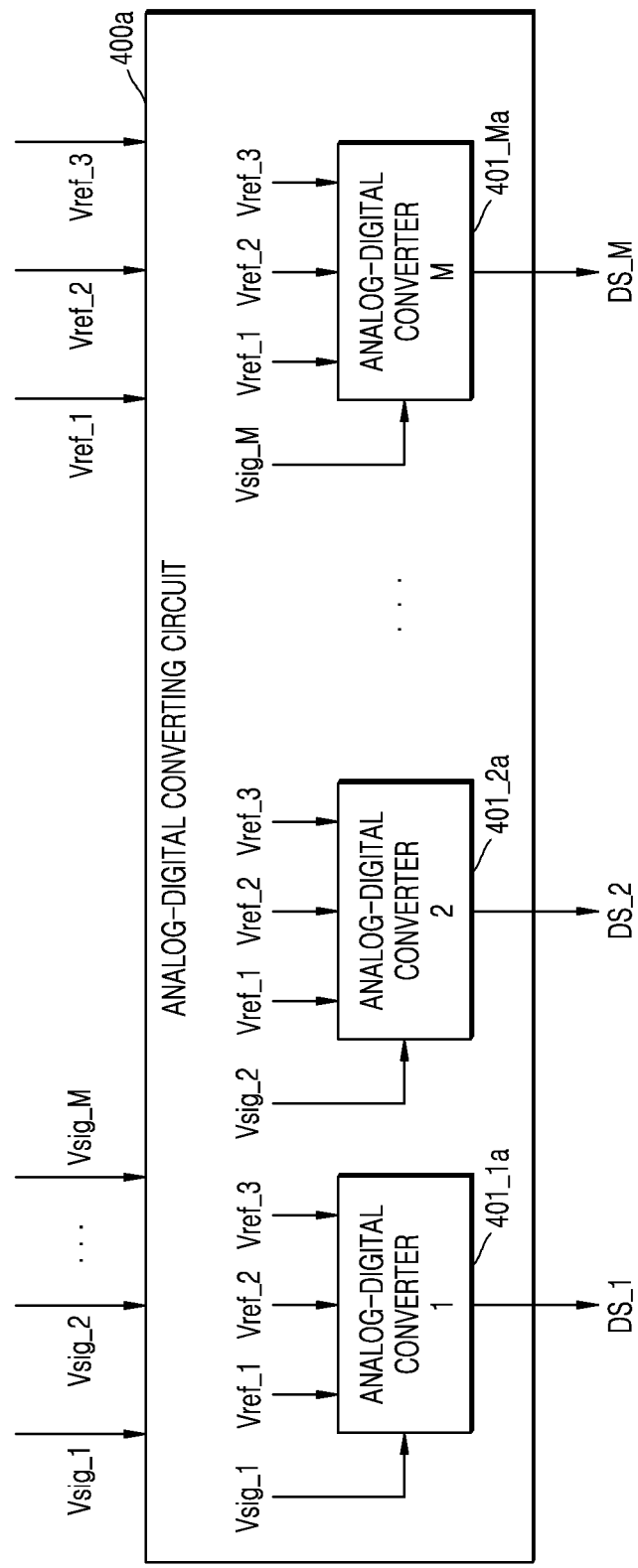
FIG. 7A is a block diagram that shows an analog-to-digital converting circuit according to an embodiment of the inventive concept.

FIG. 7A shows an analog-to-digital converting circuit 400a according to an embodiment of the inventive concept. The analog-to-digital converting circuit 400a of FIG. 7A may correspond to the analog-to-digital converting circuit 400 of FIG. 1.

The analog-to-digital converting circuit 400a may include a plurality of analog-to-digital converters, and in an embodiment, the number of analog-to-digital converters may be the same as the number of signal voltages Vsig_1, Vsig_2, . . . , Vsig_M.

For example, the analog-to-digital converting circuit 400a may include a first analog-to-digital converter 401_1a, and a second analog-to-digital converter 401_2a to an M-th analog-to-digital converter 401_Ma.

The first analog-to-digital converter 401_1a may convert the first signal voltage Vsig_1 to output the first digital signal DS_1 by using the first reference voltage Vref_1 to the third reference voltage Vref_3.

The second analog-to-digital converter 401_2a may convert the second signal voltage Vsig_2 to output the second digital signal DS_2 by using the first reference voltage Vref_1 to the third reference voltage Vref_3.

Similarly, the M-th analog-to-digital converter 401_Ma may convert the M-th signal voltage Vsig_M to output the M-th digital signal DS_M by using the first reference voltage Vref_1 to the third reference voltage Vref_3.

Each of the first analog-to-digital converters 401_1a to M-th analog-to-digital converters 401_Ma will be described in more detail with reference to FIGS. 8 and 9.

Figure 7B:
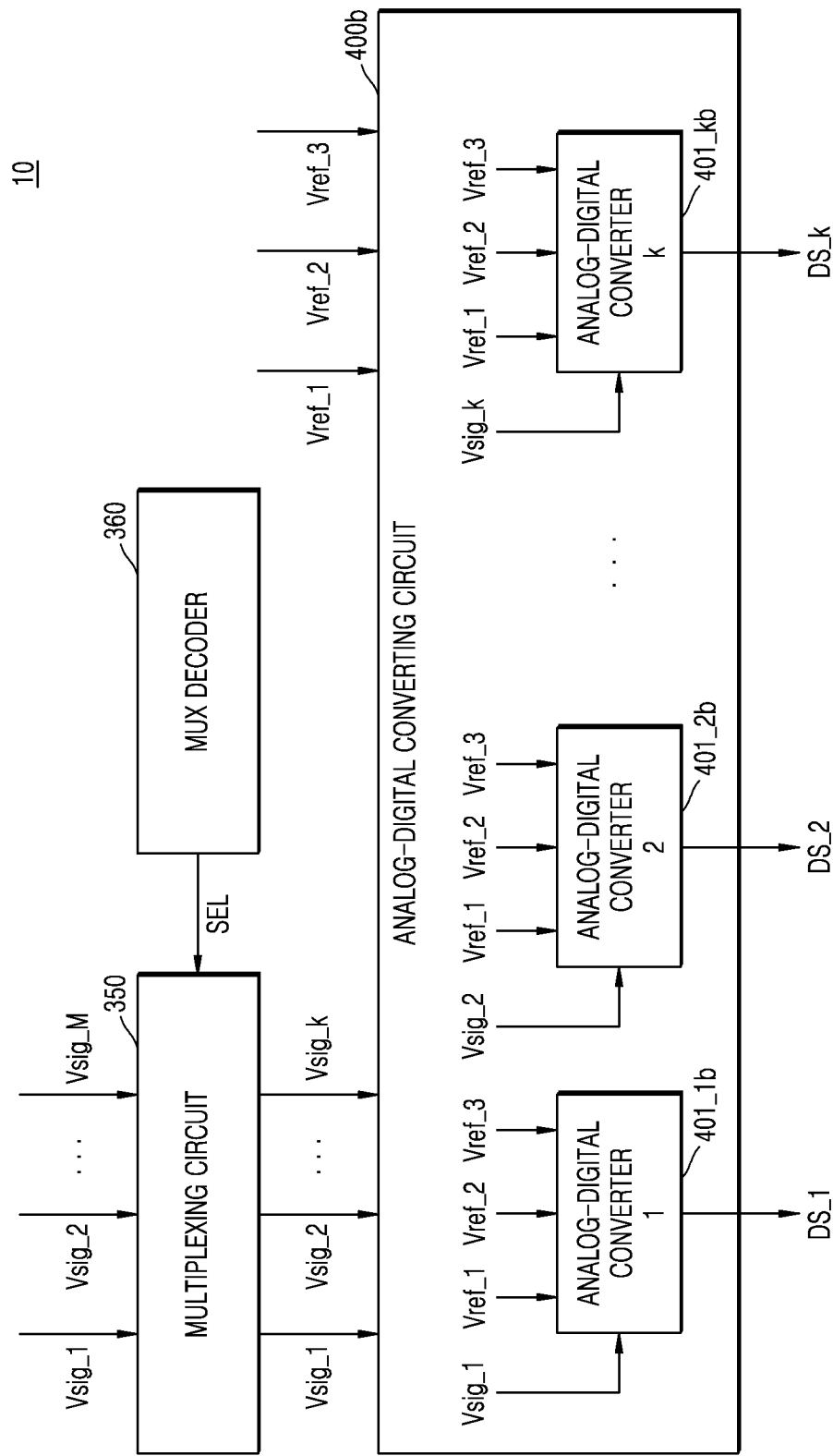
FIG. 7B is a block diagram that shows a neuromorphic computing device according to an embodiment of the inventive concept.

FIG. 7B shows the neuromorphic computing device 10 according to an embodiment of the inventive concept. FIG. 7B illustrates an embodiment in which a multiplexing circuit 350 is added between the current-to-voltage converting circuit 300 and the analog-to-digital converting circuit 400 of the neuromorphic computing device 10 of FIG. 1.

As compared to FIG. 1, the neuromorphic computing device 10 may further include the multiplexing circuit 350 and a MUX decoder 360.

An analog-to-digital converting circuit 400b may include a plurality of analog-to-digital converters, and in an embodiment, the number of analog-to-digital converters may be less than the number of signal voltages Vsig_1, Vsig_2, . . . , Vsig_M.

For example, the analog-to-digital converting circuit 400b may include a first analog-to-digital converter 401_1b, and a second analog-to-digital converter 401_2b to a k-th analog-to-digital converter 401_kb. Here, k is a natural number of 2 or more, and may be smaller than M.

The multiplexing circuit 350 may select k signal voltages from among the M signal voltages based on a selection signal SEL and provide the selected k signal voltages to the analog-to-digital converting circuit 400b. For example, the multiplexing circuit 350 may provide the first signal voltage Vsig_1 to the k-th signal voltage Vsig_k to the analog-to-digital converting circuit 400b by selecting the first signal voltage Vsig_1 to the k-th signal voltage Vsig_k from among the first signal voltage Vsig_1 to the M-th signal voltage Vsig_M based on the selection signal SEL.

The MUX decoder 360 may output the selection signal SEL to the multiplexing circuit 350 to select which of the signal voltages to output to the analog-to-digital converting circuit 400b.

The first analog-to-digital converter 401_1b may convert the first signal voltage Vsig_1 to output the first digital signal DS_1 by using the first reference voltage Vref_1 to the third reference voltage Vref_3.

The second analog-to-digital converter 401_2b may convert the second signal voltage Vsig_2 to output the second digital signal DS_2 by using the first reference voltage Vref_1 to the third reference voltage Vref_3

Similarly, the k-th analog-to-digital converter 401_kb may convert the k-th signal voltage Vsig_k to output the k-th digital signal DS_k by using the first reference voltage Vref_1 to the third reference voltage Vref_3.

Each of the first analog-to-digital converters 401_1b to k-th analog-to-digital converters 401_kb will be described in more detail with reference to FIGS. 8 and 9.

Figure 8:
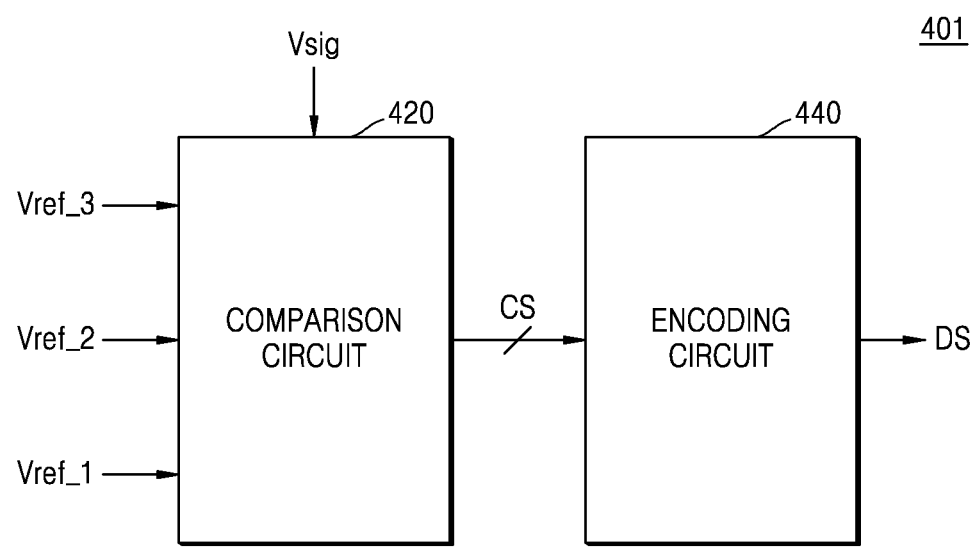
FIG. 8 is a block diagram that shows an analog-to-digital converter according to an embodiment of the inventive concept.

FIG. 8 shows an analog-to-digital converter 401 according to an embodiment of the inventive concept. The analog-to-digital converter 401 of FIG. 8 may correspond to any one of the first analog-to-digital converter 401_1a to the M-th analog-to-digital converter 401_Ma of FIG. 7A, or any one of the first analog-to-digital converter 401_1b to k-th analog-to-digital converter 401_kb of FIG. 7B.

The analog-to-digital converter 401 may convert the corresponding signal voltage Vsig to a digital signal DS using the first reference voltage Vref_1 to the third reference voltage Vref_3 to output the digital signal DS. For example, the analog-to-digital converter 401 may compare the corresponding signal voltage Vsig with the first reference voltage Vref_1 to the third reference voltage Vref_3 to output the digital signal DS.

To this end, the analog-to-digital converter 401 may include a comparison circuit 420 and an encoding circuit 440.

The comparison circuit 420 may compare the signal voltage Vsig with the first reference voltage Vref_1 to the third reference voltage Vref_3 to output a plurality of comparison signals CS. To this end, the comparison circuit 420 may include a plurality of comparators, as shown in FIG. 9. The comparison circuit 420 may provide the plurality of comparison signals CS to the encoding circuit 440.

The encoding circuit 440 may generate the digital signal DS corresponding to the signal voltage Vsig based on the plurality of comparison signals CS and output the digital signal DS.

Figure 9:
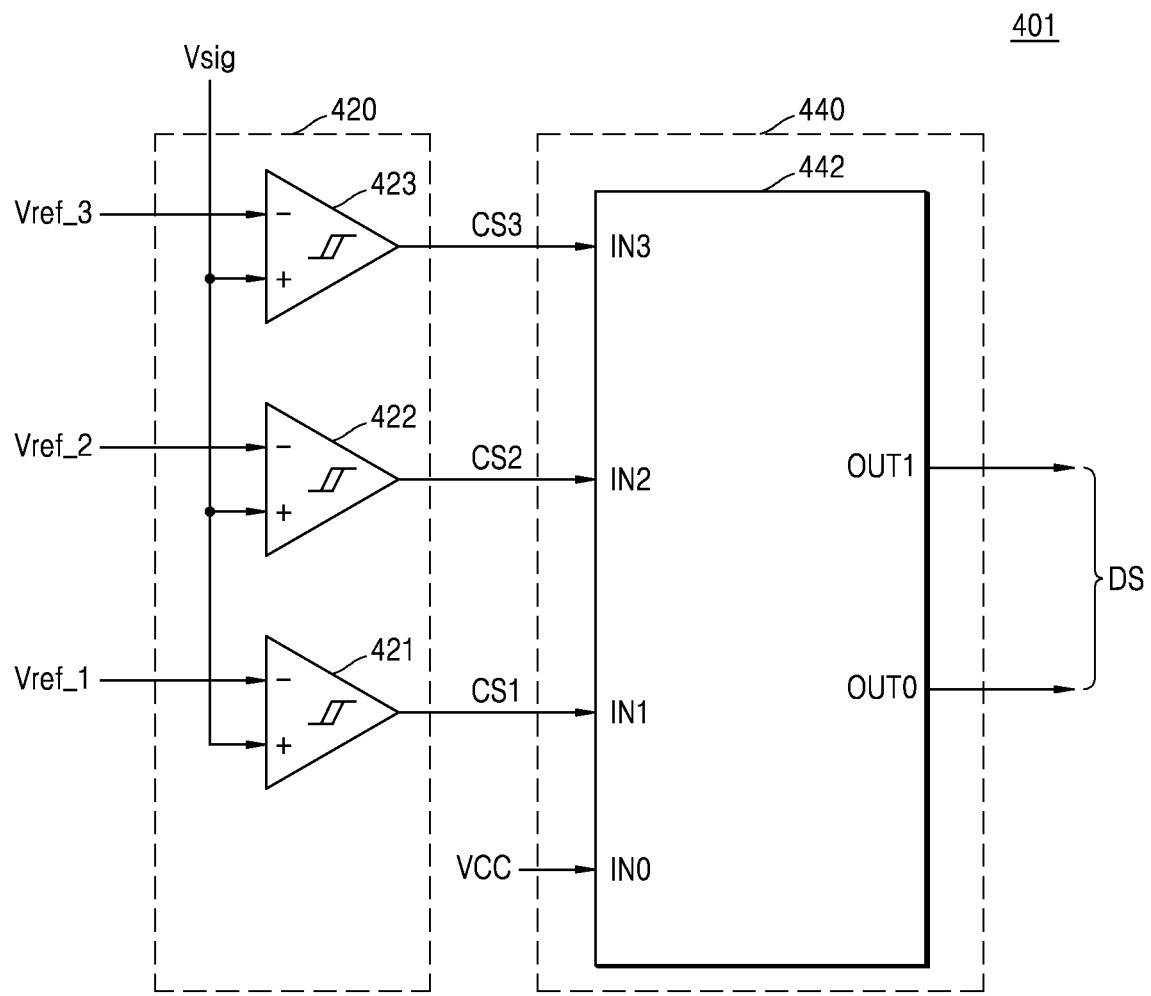
FIG. 9 is a block diagram that shows an analog-to-digital converter according to an embodiment of the inventive concept.

FIG. 9 shows the analog-to-digital converter 401 according to an embodiment of the inventive concept. FIG. 9 may show a detailed block diagram of the analog-to-digital converter 401 of FIG. 8.

The comparison circuit 420 may include a first comparator 421, a second comparator 422, and a third comparator 423.

The first comparator 421 may compare the signal voltage Vsig with the first reference voltage Vref_1 to output a first comparison signal CS1. For example, when the signal voltage Vsig is greater than the first reference voltage Vref_1, the first comparator 421 may output the first comparison signal CS1 of a first logic level '1', and when the signal voltage Vsig is not greater than the first reference voltage Vref_1, the first comparator 421 may output the first comparison signal CS1 of a second logic level '0'.

The second comparator 422 may compare the signal voltage Vsig with the second reference voltage Vref_2 to output a second comparison signal CS2. For example, when the signal voltage Vsig is greater than the second reference voltage Vref_2, the second comparator 422 may output the second comparison signal CS2 of the first logic level '1', and when the signal voltage Vsig is not greater than the second reference voltage Vref_2, the second comparator 422 may output the second comparison signal CS2 of the second logic level '0'.

The third comparator 423 may compare the signal voltage Vsig with the third reference voltage Vref_3 to output a third comparison signal CS3. For example, when the signal voltage Vsig is greater than the third reference voltage Vref_3, the third comparator 423 may output the third comparison signal CS3 of the first logic level '1', and when the signal voltage Vsig is not greater than the third reference voltage Vref_3, the third comparator 423 may output the third comparison signal CS3 of the second logic level '0'.

The encoding circuit 440 may include an encoder 442. The encoder 442 may receive the power supply voltage VCC as an input, and may receive the first comparison signal CS1 from the first comparator 421, and the second comparison signal CS2 from the second comparator 422, and the third comparison signal CS3 from the third comparator 423. The encoder 442 may output the 2-bit digital signal DS based on the first comparison signal CS1, the second comparison signal CS2, and the third comparison signal CS3.

Figure 10:
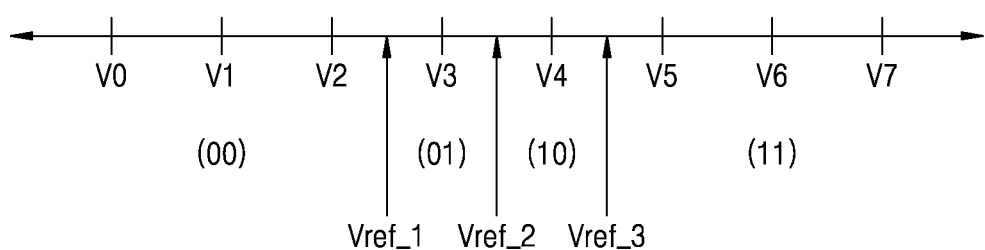
FIG. 10 is a graphical diagram that shows an operating voltage range of an analog-to-digital converting circuit and a plurality of reference voltages according to an embodiment of the inventive concept.

FIG. 10 shows an operating voltage range of the analog-to-digital converting circuit 400 and the plurality of reference voltages Vref_1, Vref_2, and Vref_3 according to an embodiment of the inventive concept. FIG. 10 shows an embodiment in which the plurality of digital signals DS_1, DS_2, . . . , DS_M output by the analog-to-digital converting circuit 400 of FIG. 1 are 2-bit digital signals. The number of bits of the digital signal and the number of reference voltages as described above are merely examples for convenience of description and are not limited to those illustrated in FIG. 10. The number of reference voltages may be one less than the number of bits squared for binary-stated bits; or more generally, one less than the number of bits raised to the power corresponding to the number of value states for multi-stated bits such as tri-level or the like. FIG. 10 is described with reference to FIG. 1 together.

The analog-to-digital converting circuit 400 may convert a plurality of signal voltages to a plurality of digital signals using a plurality of reference voltages provided from the current-to-voltage converting circuit 200. The plurality of reference voltages may be used as a reference value for converting the signal voltage in the form of an analog signal to a digital signal.

For example, when the first signal voltage Vsig_1 is less than the first reference voltage Vref_1, the analog-to-digital converting circuit 400 may output '00' as the first digital signal DS_1 corresponding to the first signal voltage Vsig_1. Also, for example, when the first signal voltage Vsig_1 is greater than or equal to the first reference voltage Vref_1 and less than the second reference voltage Vref_2, the analog-to-digital converting circuit 400 may output '01' as the first digital signal DS_1 corresponding to the first signal voltage Vsig_1. Also, for example, when the first signal voltage Vsig_1 is greater than or equal to the second reference voltage Vref_2 and less than the third reference voltage Vref_3, the analog-to-digital converting circuit 400 may output '10' as the first digital signal DS_1 corresponding to the first signal voltage Vsig_1. Also, for example, when the first signal voltage Vsig_1 is greater than or equal to the third reference voltage Vref_3, the analog-to-digital converting circuit 400 may output '11' as the first digital signal DS_1 corresponding to the first signal voltage Vsig_1.

Referring to FIG. 10, the plurality of reference voltages including the first reference voltage Vref_1 to the third reference voltage Vref_3 may unequally divide the operating voltage range of the analog-to-digital converting circuit 400.

In an embodiment, the plurality of reference voltages may divide the operating voltage range of the analog-to-digital converting circuit 400 such that the voltage interval between the reference voltages near the center of the operating voltage range of the analog-to-digital converting circuit 400 is formed narrower than the voltage interval near the side of the operating voltage range.

In performing the analog-to-digital conversion in the general neuromorphic computing device, a relatively precise operation may be required near the center of the operating voltage range. The neuromorphic computing device 10 according to an embodiment of the inventive concept may unequally quantize the operating voltage range according to the precision of the operation required in a specific voltage range, thereby increasing the accuracy of the operation required for the neuromorphic computing device 10 in accordance with the situation.

Figure 11:
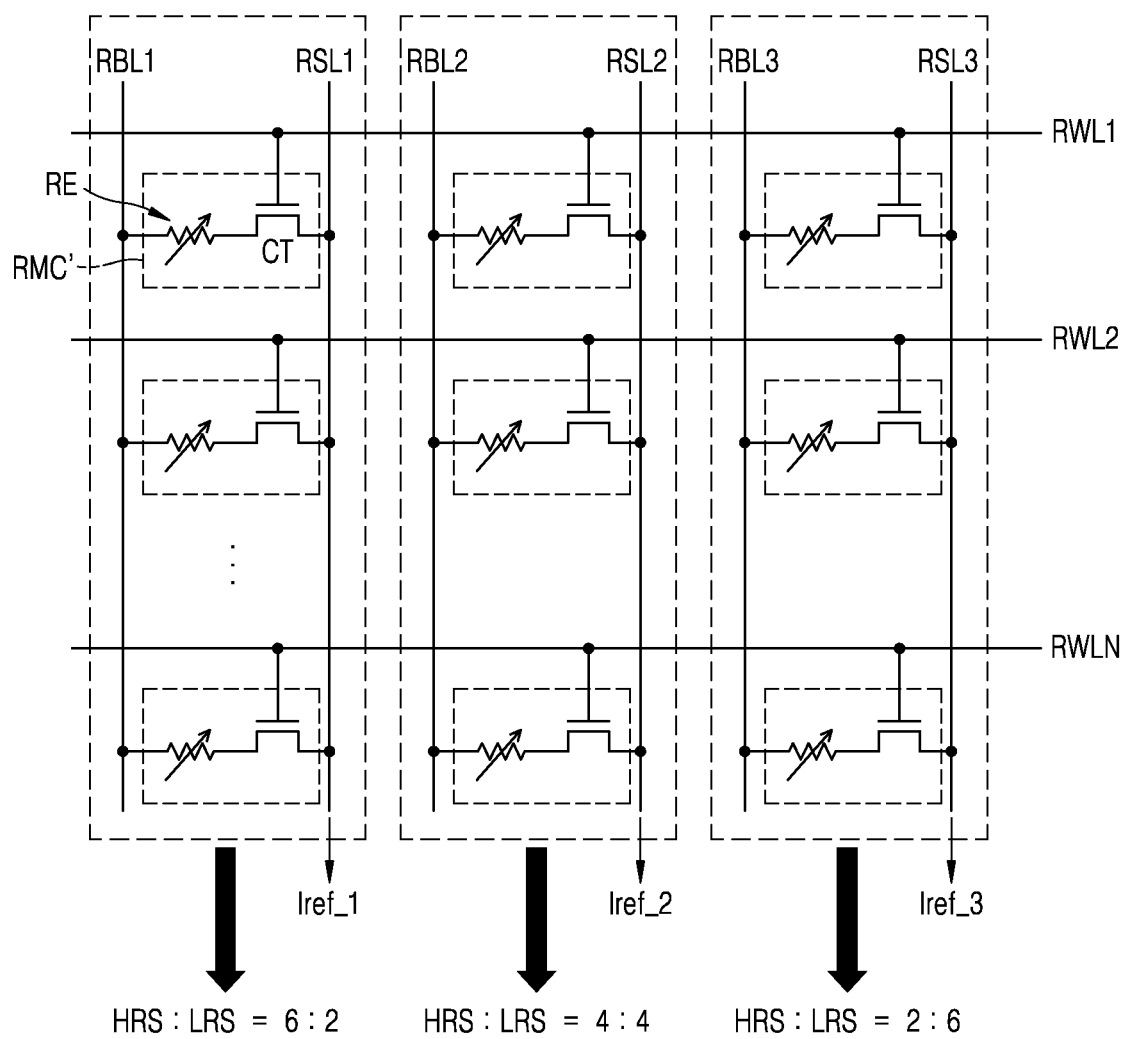
FIG. 11 is a circuit diagram that illustrates states of a second memory cell array and reference memory cells according to an embodiment of the inventive concept.

FIG. 11 illustrates states of the second memory cell array 200 and reference memory cells according to an embodiment of the inventive concept. FIG. 11 may be an example in which the number of reference bit lines is 3 in the second memory cell array 200b according to the embodiment of FIG. 4C. In particular, FIG. 11 may show an embodiment in which the operating voltage range of the analog-to-digital converting circuit is unequally divided as shown in FIG. 10. FIG. 10 is described with reference to FIG. 1, and is mainly described with respect to the differences from FIG. 6.

Compared to the case shown in FIG. 5, in the embodiment shown in FIG. 10, because the reference voltages must be further gathered near the center of the operating voltage range, the reference resistive memory cell may be written differently from the write state of the reference resistive memory cells in FIG. 6.

For example, with respect to the reference resistance memory cells connected to the first reference bit line RBL1, the ratio of the number of memory cells of the high resistance state HRS to the number of memory cells of the low resistance state LRS may be 6:2. However, the inventive concept is not limited thereto, and for example, according to the design or requirement specification, the ratio of the number of memory cells of the high resistance state HRS to the number of memory cells of the low resistance state LRS may be 7:3.

Also, for example, with respect to the reference resistance memory cells connected to the third reference bit line RBL3, the ratio of the number of memory cells of the high resistance state HRS to the number of memory cells of the low resistance state LRS may be 2:6. However, the inventive concept is not limited thereto, and for example, according to the design or requirement specification, the ratio of the number of memory cells of the high resistance state HRS to the number of memory cells of the low resistance state LRS may be 3:7.

In performing the analog-to-digital conversion in the general neuromorphic computing device 10, a relatively precise operation may be required near the center of the operating voltage range. The neuromorphic computing device 10 according to an embodiment of the inventive concept may unequally quantize the operating voltage range according to the precision of the operation required in a specific voltage range, thereby increasing the accuracy of the operation required for the neuromorphic computing device 10 in accordance with the situation.

Figure 12:
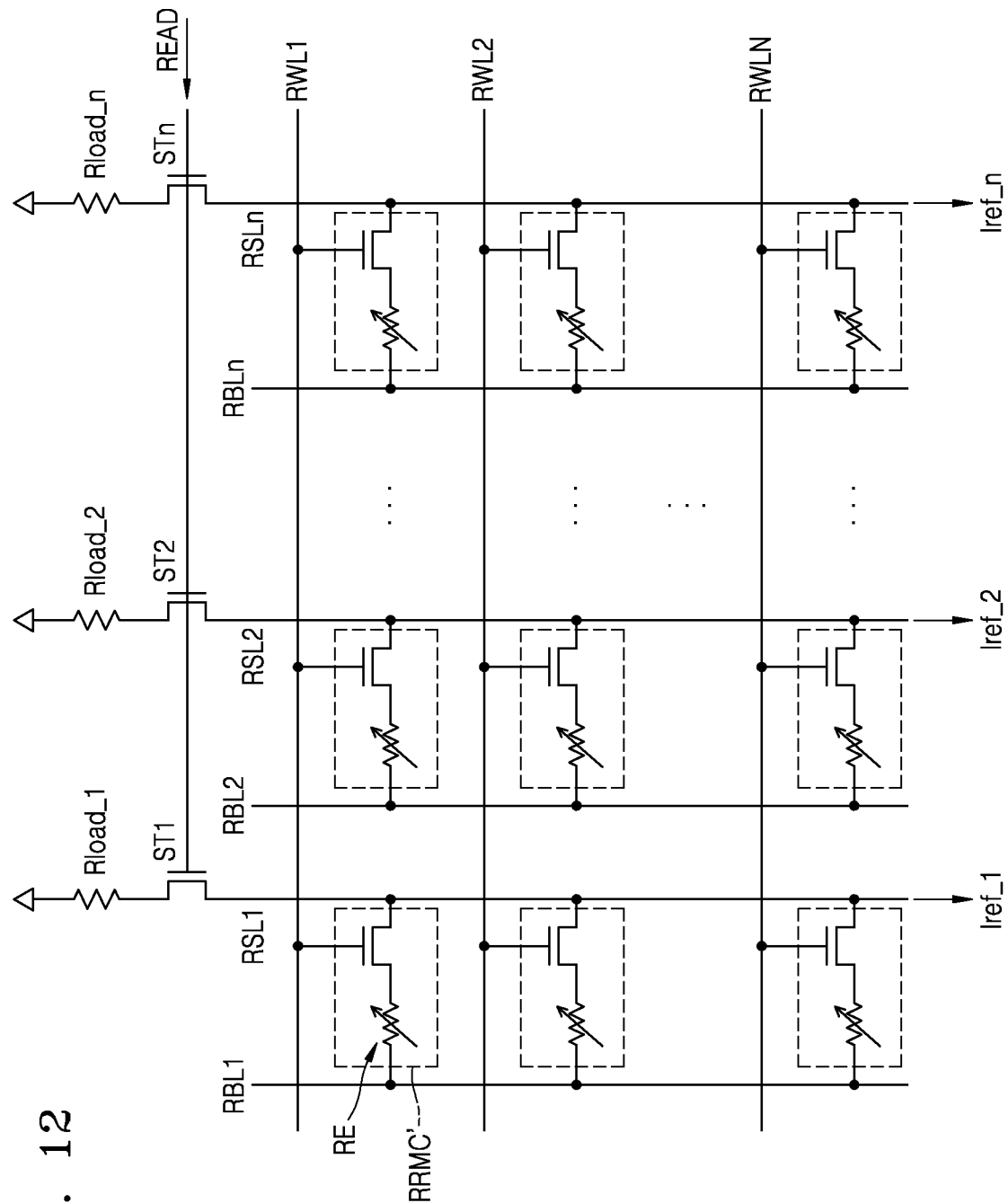
FIG. 12 is a circuit diagram that illustrates a second memory cell array according to an embodiment of the inventive concept.

FIG. 12 illustrates the second memory cell array 200 according to an embodiment of the inventive concept. FIG. 12 may be an example in which a load resistor is added to the second memory cell array 200b according to the embodiment of FIG. 4C. FIG. 12 will be mainly described with respect to differences from the embodiment of FIG. 4C.

The load resistor may be connected to reference bit lines or reference source lines of the second memory cell array 200.

For example, the first reference source line RSL1 may be connected to a first terminal of a first source transistor ST1 gated by a read signal READ, and a first load resistor Rload_1 may be connected between a second terminal of the first source transistor ST1 and a ground node. Similarly, the second reference source line RSL2 may be connected to a first terminal of a second source transistor ST2 gated by the read signal READ, and a second load resistor Rload_2 may be connected between a second terminal of the second source transistor ST2 and the ground node. Similarly, the n-th reference source line RSLn may be connected to a first terminal of an n-th source transistor STn gated by the read signal READ, and an n-th load resistor Rload_n may be connected between a second terminal of the n-th source transistor STn and the ground node.

The first load resistor Rload_1 to the n-th load resistor Rload_n may all have the same resistance value, but are not limited thereto, and may have different resistance values from each other. In an embodiment, the resistance values of the first load resistor Rload_1 to the n-th load resistor Rload_n are values between resistance values when the reference resistance memory cells are in the low resistance state LRS and high resistance state HRS.

As described above, in a resistive memory device, the resistance characteristic thereof changes over time or a temperature change, and accordingly, the distribution of the reference voltages Vref_1, Vref_2, and Vref_3 with reference to FIG. 5 or 10 may change. Accordingly, some of the reference voltages Vref_1, Vref_2, and Vref_3 may coincide with a boundary value between voltages to be actually classified. According to the second memory cell array 200 as shown in FIG. 12, a problem in which the reference voltage and the voltage boundary coincide or displace due to the drift of the reference voltage caused by the presence of the load resistance may be solved.

Figure 13:
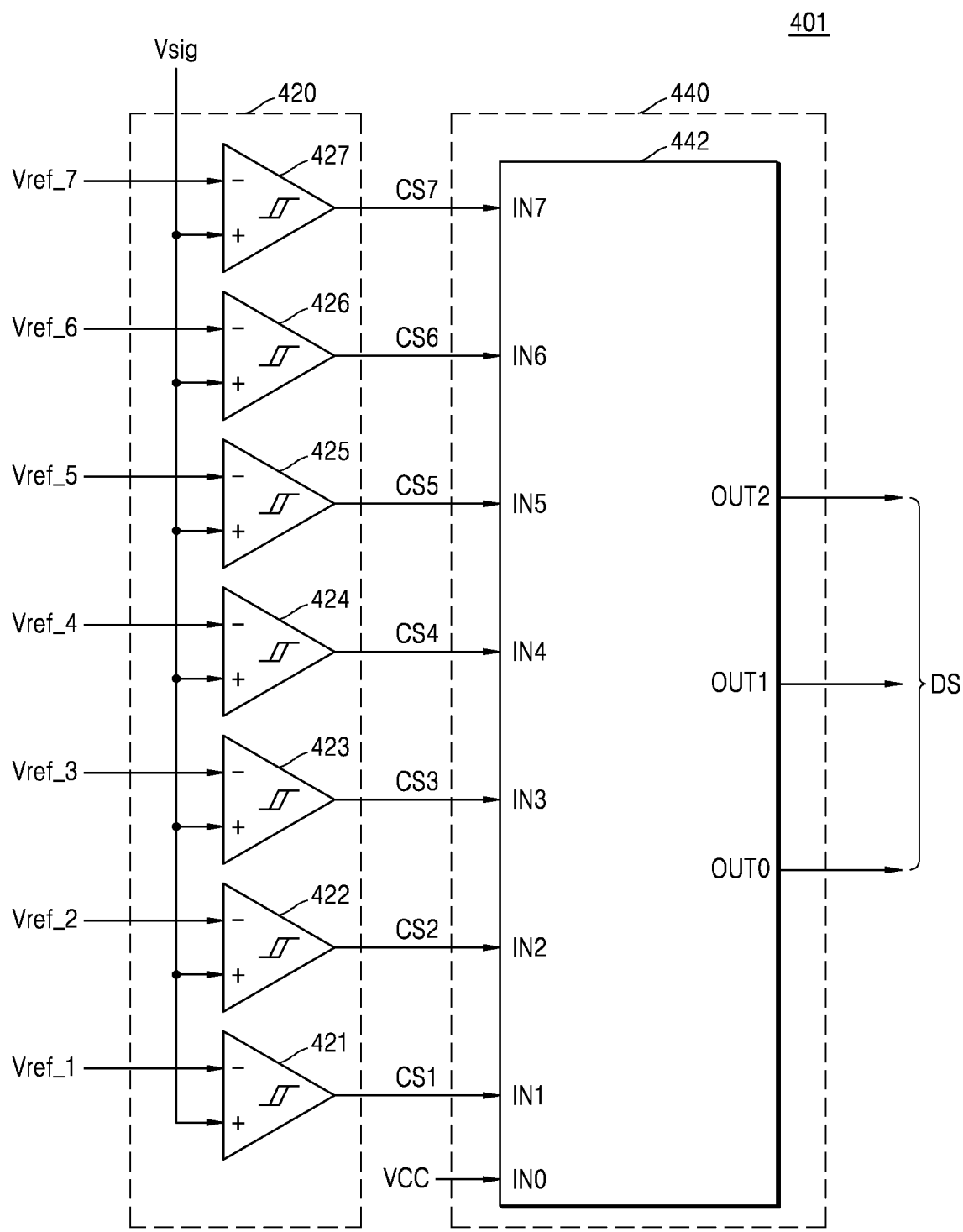
FIG. 13 is a block diagram that shows an analog-to-digital converter according to an embodiment of the inventive concept.

FIG. 13 shows the analog-to-digital converter 401 according to an embodiment of the inventive concept. The analog-to-digital converter 401 of FIG. 13 may correspond to any one of the first analog-to-digital converter 401_1a to the M-th analog-to-digital converter 401_Ma of FIG. 7A or the first analog-to-digital converter 401_1b to k-th analog-to-digital converter 401_KB of FIG. 7B. FIG. 13 shows an embodiment in which the digital signal DS is a 3-bit digital signal when compared with FIG. 9.

The comparison circuit 420 may include a first comparator 421 to a seventh comparator 427, and the encoder 442 may output the 3-bit digital signal DS.

Operations of the first comparator 421 to the seventh comparator 427 and the encoder 442 may be performed similarly as described with respect to FIG. 9.

For example, the first comparator 421 may compare the signal voltage Vsig with the first reference voltage Vref_1 to output the first comparison signal CS1. For example, when the signal voltage Vsig is greater than the first reference voltage Vref_1, the first comparator 421 may output the first comparison signal CS1 of a first logic level '1', and when the signal voltage Vsig is not greater than the first reference voltage Vref_1, the first comparator 421 may output the first comparison signal CS1 of a second logic level '0'.

Similarly, the second comparator 422 may compare the signal voltage Vsig with the second reference voltage Vref_2 to output the second comparison signal CS2, the third comparator 423 may compare the signal voltage Vsig with the third reference voltage Vref_3 to output the third comparison signal CS3, the fourth comparator 424 may compare the signal voltage Vsig with the fourth reference voltage Vref_4 to output the fourth signal CS4, the fifth comparator 425 may compare the signal voltage Vsig with the fifth reference voltage Vref_5 to output the fifth comparison signal CS5, the sixth comparator 426 may compare the signal voltage Vsig with the sixth reference voltage Vref_6 to output the sixth comparison signal CS6, and the seventh comparator 427 may compare the signal voltage Vsig with the seventh reference voltage Vref_7 to output the seventh comparison signal CS7.

The encoder 442 may receive the power supply voltage VCC as an input, receive the first comparison signal CS1 from the first comparator 421, receive the second comparison signal CS2 from the second comparator 422, receive the third comparison signal CS3 from the third comparator 423, receive the fourth comparison signal CS4 from the fourth comparator 424, receive the fifth comparison signal CS5 from the fifth comparator 425, receive the sixth comparison signal CS6 from the sixth comparator 426, and receive the seventh comparison signal CS7 from the seventh comparator 427. The encoder 442 may output the 3-bit digital signal DS based on the first comparison signal CS1, the second comparison signal CS2, the third comparison signal CS3, the fourth comparison signal CS4, the fifth comparison signal CS5, the sixth comparison signal CS6, and the seventh comparison signal CS7.

Figure 14:
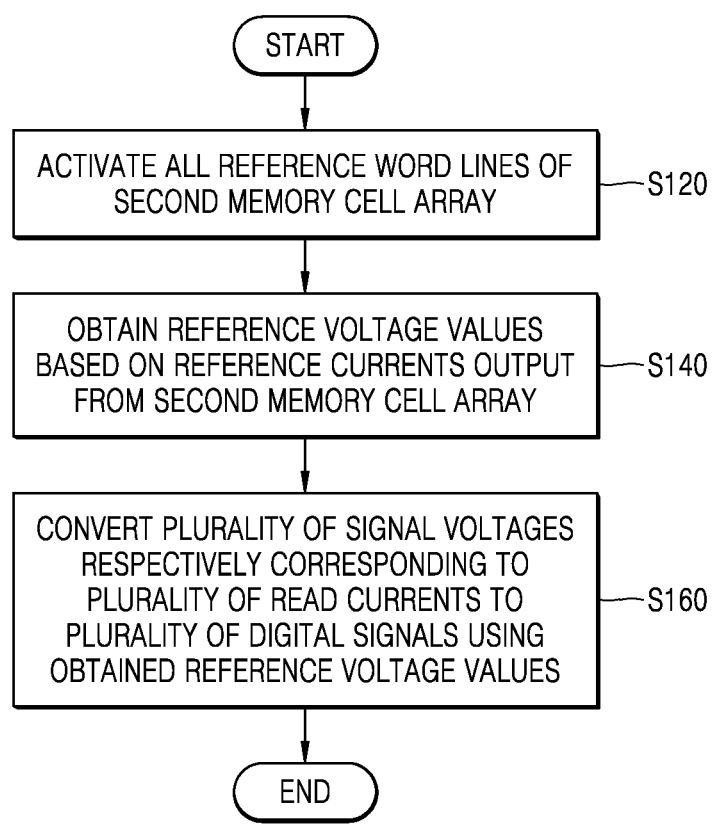
FIG. 14 is a flowchart diagram of an operation method of a neuromorphic computing device according to an embodiment of the inventive concept.

FIG. 14 is a flowchart of an operation method of the neuromorphic computing device 10 according to an embodiment of the inventive concept. FIG. 14 is described with reference to FIG. 1 together.

The neuromorphic computing device 10 may activate all reference word lines connected to the second memory cell array 200 (S120). For example, the word line driver 150 may drive the plurality of reference word lines RWL1, RWL2, . . . , RWLN such that the plurality of reference word lines RWL1, RWL2, . . . , RWLN are all activated.

The neuromorphic computing device 10 may obtain reference voltage values based on the reference currents Iref_1, Iref_2, . . . , Iref_n output from the second memory cell array 200 (S140).

The neuromorphic computing device 10 may convert the plurality of signal voltages Vsig_1, Vsig_2, . . . , Vsig_M respectively corresponding to the plurality of read currents Iread_1, Iread_2, . . . , Iread_M to the plurality of digital signals DS_1, DS_2, . . . , DS_M, using the obtained reference voltage values (S160).

Figure 15:
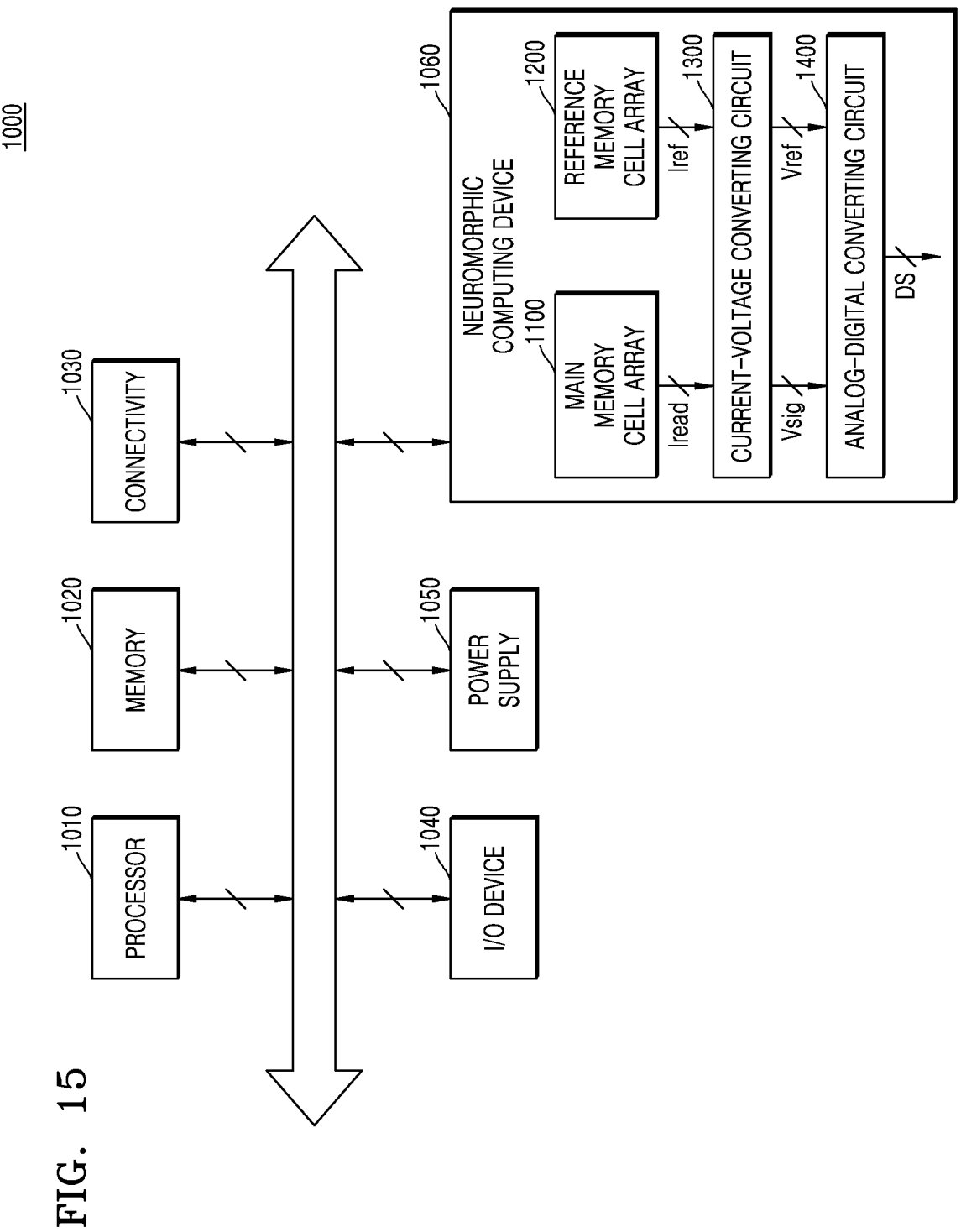
FIG. 15 is a block diagram that shows an electronic system according to an embodiment of the inventive concept.

FIG. 15 shows an electronic system 1000 according to an embodiment of the inventive concept.

The electronic system 1000 may include a processor 1010, a memory device 1020, a connectivity 1030, an input/output (I/O) device 1040, a power supply 1050, and a neuromorphic computing device 1060. The electronic system 1000 may further include various ports that may communicate with a video card, a sound card, a memory card, a USB device, or other systems.

The processor 1010 may control all operations of the electronic system 1000 and may execute an operating system, applications, or the like. The memory device 1020 may store data necessary for the operation of the electronic system 1000. The connectivity 1030 may communicate with an external device. The I/O device 1040 may include input means such as a keyboard, a keypad, a touch pad, a touch screen, a mouse, a remote controller, or the like, and output means such as a display, a speaker, a printer, or the like. The power supply 1050 may supply power required for the operation of the electronic system 1000.

The neuromorphic computing device 1060 may drive and/or execute a neural network system, and may be a neuromorphic computing device according to embodiments of the inventive concept described with reference to the preceding drawings. The neuromorphic computing device 1060 may include a main memory cell array 1100 corresponding to the first memory cell array 100 of the preceding figures, and a reference memory cell array 1200 corresponding to the second memory cell array 200 of the preceding figures, a current-to-voltage converting circuit 1300, and an analog-to-digital converting circuit 1400.

For example, the main memory cell array 1100 may provide a plurality of read currents Tread to the current-to-voltage converting circuit 1300, and the reference memory cell array 1200 may provide a plurality of reference currents Iref to the current-to-voltage converting circuit 1300.

The current-to-voltage converting circuit 1300 may output a plurality of signal voltages Vsig by converting the plurality of read currents Tread, and provide the plurality of signal voltages Vsig to the analog-to-digital converting circuit 1400. The current-to-voltage converting circuit 1300 may output a plurality of reference voltages Vref by converting the plurality of reference currents Iref, and provide the plurality of reference voltages Vref to the analog-to-digital converting circuit 1400.

The analog-to-digital converting circuit 1400 may convert the plurality of signal voltages Vsig to the plurality of digital signals DS by using the plurality of reference voltages Vref as a reference for analog-to-digital conversion.

While the inventive concept has been particularly shown and described with reference to embodiments thereof, it will be understood that various changes in form and details may be made therein without departing from the spirit and scope of the following claims.

What is claimed is:

1. A neuromorphic computing device comprising:
a first memory cell array comprising a plurality of resistive memory cells and configured to output a plurality of read currents through a plurality of bit lines or source lines;
a second memory cell array comprising a plurality of reference resistive memory cells and configured to output at least one reference current through at least one reference bit line or at least one reference source line;
a current-voltage converting circuit configured to output a plurality of signal voltages respectively corresponding to the plurality of read currents and output at least one reference voltage corresponding to the at least one reference current; and
an analog-digital converting circuit configured to convert the plurality of signal voltages to a plurality of digital signals using the at least one reference voltage and output the plurality of digital signals.

2. The neuromorphic computing device of claim 1, wherein each of the plurality of reference resistive memory cells comprises a same resistive material as a material of the plurality of resistive memory cells.

3. The neuromorphic computing device of claim 1, wherein a number of the at least one reference bit line is the same as a number obtained by subtracting 1 from 2 raised to the power of a number of bits of each of the plurality of digital signals.

4. The neuromorphic computing device of claim 1, wherein the at least one reference bit line comprises a first reference bit line and a second reference bit line, and
wherein a ratio of a number of memory cells in a high resistance state to a number of memory cells in a low resistance state of first reference memory cells connected to the first reference bit line among the plurality of reference resistance memory cells is different from a ratio of a number of memory cells in the high resistance state to a number of memory cells in the low resistance state of second reference memory cells connected to the second reference bit line among the plurality of reference resistance memory cells.

5. The neuromorphic computing device of claim 1, wherein the at least one reference voltage equally quantizes an operating voltage range of the analog-digital converting circuit, and
wherein reference resistive memory cells connected to each of the at least one reference bit line have a resistance state distribution to form a corresponding reference voltage among the at least one reference voltage.

6. The neuromorphic computing device of claim 1, wherein the at least one reference voltage unequally quantizes an operating voltage range of the analog-digital converting circuit, wherein a quantization interval adjacent to a center of an operation voltage range is narrower than a quantization interval adjacent to a side of the operation voltage range, and
wherein reference resistive memory cells connected to each of the at least one reference bit line have a resistance state distribution to form a corresponding reference voltage among the at least one reference voltage.

7. The neuromorphic computing device of claim 1, wherein the analog-digital converting circuit comprises a plurality of analog-digital converters corresponding to each of the plurality of signal voltages and configured to convert a corresponding signal voltage to a digital signal.

8. The neuromorphic computing device of claim 1, further comprising a multiplexing circuit configured to select signal voltages from among the plurality of signal voltages and output the selected signal voltages,
  wherein the analog-digital converting circuit comprises a plurality of analog-digital converters configured to convert the selected signal voltages to digital signals, wherein a number analog-digital converters is less than a number of signal voltages.

9. The neuromorphic computing device of claim 1, wherein the analog-digital converting circuit comprises a plurality of analog-digital converters configured to convert a corresponding signal voltage among the plurality of signal voltages to a digital signal, and
  wherein each of the plurality of analog-to-digital converters is configured to output a digital signal corresponding to the corresponding signal voltage by comparing the corresponding signal voltage with the at least one reference voltage.

10. The neuromorphic computing device of claim 9, wherein each of the plurality of analog-to-digital converters comprises:
  a comparison circuit configured to output at least one comparison signal by comparing the corresponding signal voltage with the at least one reference voltage; and
  an encoding circuit configured to output the digital signal corresponding to the corresponding signal voltage based on the at least one comparison signal.

11. The neuromorphic computing device of claim 1, wherein, between the at least one reference source line and a ground node, a load resistor having a resistance value between a low resistance state and a high resistance state of the reference resistive memory cells is connected.

12. The neuromorphic computing device of claim 1, further comprising a word line driver configured to drive a plurality of word lines connected to the first memory cell array, drive a plurality of reference word lines connected to the second memory cell array, and drive the plurality of reference word lines such that all the plurality of reference word lines are activated during a calculating operation of the neuromorphic computing device.

13. The neuromorphic computing device of claim 12, wherein states corresponding to elements of a weight matrix used in the calculating operation of the neuromorphic computing device are written to the plurality of resistive memory cells, and
  wherein the word line driver is configured to activate at least one word line among the plurality of word lines according to element values of an input feature vector in the calculating operation of the neuromorphic computing device.

14. The neuromorphic computing device of claim 13, further comprising an adder circuit configured to generate output data by performing an accumulation and/or summation operation using the plurality of digital signals.

15. An operating method of a neuromorphic computing device comprising a first memory cell array comprising main resistive memory cells and a second memory cell array comprising reference resistive memory cells, the method comprising:
  activating all reference word lines connected to the second memory cell array;
  obtaining, from a current-voltage converting circuit, at least one reference voltage value based on at least one reference current output from the second memory cell array; and
  outputting, by an analog-digital converting circuit, a plurality of digital signals by converting signal voltage values corresponding to read currents output from the first memory cell array using the at least one reference voltage value.

16. The method of claim 15, wherein each of the reference resistive memory cells comprises a same resistive material as a material of the main resistive memory cells.

17. The method of claim 15, wherein the outputting of the plurality of digital signals comprises:
  generating at least one comparison signal by comparing a first signal voltage value among the signal voltage values with the at least one reference voltage value; and
  outputting a first digital signal corresponding to the first signal voltage value based on the at least one comparison signal.

18. The method of claim 15, further comprising generating output data by performing an accumulation and/or summation operation using the plurality of digital signals.

19. A neuromorphic computing device comprising:
  a first resistive memory cell array comprising a plurality of resistive memory cells disposed in a region where a plurality of word lines intersect with a plurality of bit lines;
  a second resistive memory cell array comprising a plurality of reference resistive memory cells disposed in a region where a plurality of reference word lines intersect with a plurality of reference bit lines;
  a word line driver configured to drive the plurality of word lines and the plurality of reference word lines, activate at least one selected word line among the plurality of word lines according to element values of an input feature vector, and activate all of the plurality of reference word lines;
  a current-voltage converting circuit configured to convert a plurality of reference currents output from the second resistive memory cell array to a plurality of reference voltages through electrical paths comprising the plurality of reference bit lines, and convert a plurality of read currents output from the first resistive memory cell array to a plurality of signal voltages through electrical paths comprising the plurality of bit lines according to the activating of the at least one selected word line;
  an analog-digital converting circuit configured to convert the plurality of signal voltages to a plurality of digital signals and output the plurality of digital signals, using the plurality of reference voltages as a reference for analog-digital conversion; and
  an adder circuit configured to generate at least one piece of output data by performing an accumulation and/or summation operation using the plurality of digital signals,
  wherein each of the plurality of reference currents is based on a resistance state of each of at least one reference resistive memory cell of the plurality of reference resistive memory cells, the at least one reference resistive memory cell being connected to a corresponding reference bit line of the plurality of reference bit lines.

20. The neuromorphic computing device of claim 19, wherein each of the plurality of reference resistive memory cells comprises a same resistive material as a material of the plurality of resistive memory cells, and
  wherein a number of reference bit lines corresponds to a number obtained by subtracting 1 from 2 raised to the power of a number of bits of each of the plurality of digital signals.

* * * * *